US012558740B2

(12) United States Patent
Taylor et al.

(10) Patent No.: US 12,558,740 B2
(45) Date of Patent: Feb. 24, 2026

(54) PHASE MODIFIED QUASI-NON-DIFFRACTING LASER BEAMS FOR SIMULTANEOUS HIGH ANGLE LASER PROCESSING OF TRANSPARENT WORKPIECES

(71) Applicant: CORNING INCORPORATED, Corning, NY (US)

(72) Inventors: Lauren Leigh Taylor, Williamsport, PA (US); Craig John Mancusi Ungaro, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 826 days.

(21) Appl. No.: 17/872,375

(22) Filed: Jul. 25, 2022

(65) Prior Publication Data

US 2023/0036386 A1     Feb. 2, 2023

Related U.S. Application Data

(60) Provisional application No. 63/226,369, filed on Jul. 28, 2021.

(30) Foreign Application Priority Data

Aug. 25, 2021    (NL) .................................... 2029054

(51) Int. Cl.
  B23K 26/06      (2014.01)
  B23K 26/066     (2014.01)
      (Continued)
(52) U.S. Cl.
  CPC ........ B23K 26/0604 (2013.01); B23K 26/066 (2015.10); B23K 26/067 (2013.01);
      (Continued)

(58) Field of Classification Search
  CPC ...... G02B 5/001; G02B 26/06; G02B 5/1819; B23K 26/0608; B23K 26/0652; B23K 26/38; B23K 26/0676; B23K 2103/54
  See application file for complete search history.

(56) References Cited

U.S. PATENT DOCUMENTS 10,173,916 B2 *  1/2019  Bankaitis ........... B23K 26/0869
10,597,321 B2    3/2020  Marjanovic et al.
      (Continued)

FOREIGN PATENT DOCUMENTS

CN      111362570 B      3/2021
WO      2021/108079 A1   6/2021
WO      2021/158458 A1   8/2021

OTHER PUBLICATIONS

International Search Report and Written Opinion of the International Searching Authority; PCT/US22/37272; mailed on Nov. 7, 2022, 13 pages; European Patent Office.
      (Continued)

*Primary Examiner* — Jesse S Bogue
(74) *Attorney, Agent, or Firm* — Daniel J. Greenhalgh

(57)     ABSTRACT

A method of processing a transparent workpiece that includes directing a laser beam combination comprising a first beam and a second beam into the transparent workpiece simultaneously, the first beam passing through an impingement surface of the transparent workpiece at a first impingement location and the second beam passing through the impingement surface at a second impingement location. The first beam forms a first laser beam focal line in the transparent workpiece and generates a first induced absorption to produce a first defect segment within the transparent workpiece, the first defect segment having a first chamfer angle and the second beam forms a second laser beam focal line in the transparent workpiece and generates a second induced absorption to produce a second defect segment within the
      (Continued)

transparent workpiece, the second defect segment having a second chamfer angle, the second chamfer angle differing from the first chamfer angle.

22 Claims, 22 Drawing Sheets

(51) Int. Cl.
  *B23K 26/067*     (2006.01)
  *B23K 26/073*     (2006.01)
  *B23K 26/55*      (2014.01)
  *B23K 26/064*     (2014.01)

(52) U.S. Cl.
  CPC ............ *B23K 26/073* (2013.01); *B23K 26/55* (2015.10); *B23K 26/0643* (2013.01); *B23K 26/0648* (2013.01)

(56)                References Cited

U.S. PATENT DOCUMENTS

| | | | |
|---|---|---|---|
| 10,688,599 B2 * | 6/2020 | Liu | B23K 26/0617 |
| 10,730,783 B2 | 8/2020 | Akarapu et al. | |
| 2011/0141567 A1 | 6/2011 | Stack et al. | |
| 2015/0034613 A1 * | 2/2015 | Hosseini | B23K 26/0006 |
| | | | 219/121.61 |
| 2015/0136743 A1 * | 5/2015 | Hosseini | C03B 33/091 |
| | | | 219/121.61 |
| 2015/0346138 A1 | 12/2015 | Allen et al. | |
| 2018/0134604 A1 * | 5/2018 | Ortner | B23K 26/0624 |
| 2020/0361037 A1 * | 11/2020 | Ivanov | B23K 26/38 |
| 2021/0237198 A1 | 8/2021 | Ungaro | |
| 2021/0387286 A1 | 12/2021 | Ungaro | |

OTHER PUBLICATIONS

NL Search Report 2029054; dated Apr. 7, 2022; 10 pages; European Patent Office.

* cited by examiner

PHASE MODIFIED QUASI-NON-DIFFRACTING LASER BEAMS FOR SIMULTANEOUS HIGH ANGLE LASER PROCESSING OF TRANSPARENT WORKPIECES

This application claims the benefit of priority to Dutch Patent Application No. 2029054 filed on Aug. 25, 2021, which claims priority from U.S. Provisional Patent Application Ser. No. 63/226,369 filed on Jul. 28, 2021, the content of which is relied upon and incorporated herein by reference in its entirety.

BACKGROUND

Field

The present specification generally relates to apparatuses and methods for laser processing transparent workpieces, and more particularly, to laser beams comprising laser beam focal lines that are quasi-non-diffracting and retain a quasi-non-diffracting character when directed into a transparent workpiece at a non-normal angle of incidence.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Many methods of separating glass substrates result in square separated edges that are prone to breakage and are often processed to have bevels or to be rounded to minimize the chance of breakage. Currently, the non-square edges are often accomplished using mechanical means, such as mechanical grinding and polishing. However, the processes generate glass dust and particles, which must be cleaned by additional process steps involving washing or chemical treatments. Accordingly, a need exists for alternative improved methods for separating glass substrates which replace the conventional edge finishing process with a particle free and high throughput process.

SUMMARY

According to first aspect of the present disclosure, a method of processing a transparent workpiece that includes directing a laser beam combination comprising a first beam and a second beam into the transparent workpiece simultaneously, the first beam passing through an impingement surface of the transparent workpiece at a first impingement location and the second beam passing through the impingement surface of the transparent workpiece at a second impingement location. The first beam of the laser beam combination forms a first laser beam focal line in the transparent workpiece and generates a first induced absorption to produce a first defect segment within the transparent workpiece, the first defect segment having a first chamfer angle and the second beam of the laser beam combination forms a second laser beam focal line in the transparent workpiece and generates a second induced absorption to produce a second defect segment within the transparent workpiece, the second defect segment having a second chamfer angle, the second chamfer angle differing from the first chamfer angle.

A second aspect of the present disclosure includes the method of the first aspect, wherein the first impingement location and the second impingement location are laterally offset along the impingement surface.

A third aspect of the present disclosure includes the method of any of the previous aspects, wherein the second chamfer angle is greater than 5° relative to a plane orthogonal to the impingement surface at the second impingement location.

A fourth aspect of the present disclosure includes the method of any of the previous aspects, wherein the second chamfer angle is less than 1° relative to a plane orthogonal to the impingement surface at the second impingement location.

A fifth aspect of the present disclosure includes the method of any of the previous aspects, wherein the first laser beam focal line extends between the impingement surface and a first termination depth within the transparent workpiece and terminates at a first termination location positioned at the first termination depth.

A sixth aspect of the present disclosure includes the method of the fifth aspect, wherein the second laser beam focal line extends from the first termination location positioned at the first termination depth to a second termination location positioned at a second termination depth within the transparent workpiece.

A seventh aspect of the present disclosure includes the method of the fifth aspect or the sixth aspect, wherein the second laser beam focal line extends from the first termination location positioned at the first termination depth to a second termination location positioned at a second termination depth within the transparent workpiece.

An eighth aspect of the present disclosure includes the method of any of the previous aspects, wherein the laser beam combination further comprises a third beam directed into the transparent workpiece at a third impingement location, wherein the third beam forms a third laser beam focal line in the transparent workpiece and generates a third induced absorption to produce a third defect segment within the transparent workpiece, the third defect segment having a third chamfer angle, the third chamfer angle differing from the second chamfer angle.

A ninth aspect of the present disclosure includes the method of the eighth aspect, wherein the third chamfer angle differs from the first chamfer angle.

A tenth aspect of the present disclosure includes the method of the eighth aspect or the ninth aspect, wherein the first laser beam focal line extends between the impingement surface and a first termination depth within the transparent workpiece and terminates at a first termination location positioned at the first termination depth, the second laser beam focal line extends from the first termination location at the first termination depth to a second termination location positioned at a second termination depth within the transparent workpiece, where the first termination depth is closer to the impingement surface of the transparent workpiece than the second termination depth, and the third laser beam focal line extends from the second termination location toward a second surface of the transparent workpiece.

An eleventh aspect of the present disclosure includes the method of any of the eighth aspect through the tenth aspect, wherein the third laser beam focal line reaches the second surface at an exit location, wherein the exit location is positioned along a plane orthogonal to the impingement surface at the first impingement location.

A twelfth aspect of the present disclosure includes the method of any of the eighth aspect through the eleventh aspect, wherein the second impingement location is positioned between the first impingement location and the third impingement location on the impingement surface of the transparent workpiece.

A thirteenth aspect of the present disclosure includes the method of any of the eighth aspect through the twelfth aspect, wherein the first beam, the second beam, and the third beam are directed into the transparent workpiece simultaneously.

A fourteenth aspect of the present disclosure includes the method of any of the previous aspects, wherein the first laser beam focal line and the second laser beam focal line each comprise: a wavelength $\lambda$; a spot size $w_o$; and a Rayleigh range $Z_R$ that is greater than $$F_D \frac{\pi w_o^2}{\lambda},$$

where $F_D$ is a dimensionless divergence factor comprising a value of 10 or greater.

A fifteenth aspect of the present disclosure includes the method of the fourteenth aspect, wherein the dimensionless divergence factor $F_D$ comprises a value of from 10 to 2000.

A sixteenth aspect of the present disclosure includes the method of any of the previous aspects and further includes impinging the laser beam combination onto a phase altering optical element to apply a phase alteration to the first beam and the second beam.

A seventeenth aspect of the present disclosure includes the method of the sixteenth aspect, wherein the first beam comprises an oblong angular spectrum when produced in free space downstream from the phase altering optical element, the oblong angular spectrum comprising an axis of symmetry extending from a first axis end having a first radius of curvature to a second axis end having a second radius of curvature, where the first radius of curvature and the second radius of curvature are different.

An eighteenth aspect of the present disclosure includes the method of the seventeenth aspect, wherein the oblong angular spectrum of the first beam incident to the impingement surface comprises a minor axis orthogonal to the axis of symmetry and the minor axis intersects the axis of symmetry at an intersection point that is laterally offset from a centerpoint of a final focusing optic positioned upstream the impingement surface.

A nineteenth aspect of the present disclosure includes the method of the seventeenth aspect or the eighteenth aspect, wherein the second beam incident to the impingement surface comprises a circular angular spectrum.

A twentieth aspect of the present disclosure includes the method of the sixteenth aspect, wherein the phase altering optical element comprises a diffractive optical element comprising a first diffraction region that is laterally offset from a second diffraction region along a surface of the diffractive optical element, the first diffraction region is configured to apply an aberration corrected quasi-non-diffracting phase and a prism phase to the first beam of the laser beam combination, and the second diffraction region is configured to apply a quasi-non-diffracting phase to the second beam of the laser beam combination.

A twenty-first aspect of the present disclosure includes the method of the twentieth aspect or the eighteenth aspect, wherein the diffractive optical element is a second diffractive optical element and the method further comprises directing an initial beam output by a beam source onto a first diffractive optical element comprising a diffractive beam splitter, the diffractive beam splitter forming the laser beam combination from the initial beam and directing the laser beam combination to the second diffractive optical element.

A twenty-second aspect of the present disclosure includes the method of the sixteenth aspect, wherein the phase altering optical element comprises an adaptive phase altering optical element.

A twenty-third aspect of the present disclosure includes the method of the twenty-second aspect, wherein the adaptive phase altering optical element comprises a spatial light modulator, a deformable mirror, or an adaptive phase plate.

A twenty-fourth aspect of the present disclosure includes the method of the twenty-second aspect or the twenty-third aspect, wherein the applying the phase alteration to the first beam and the second beam comprises directing an initial beam from a beam source onto a first section of the adaptive phase altering optical element, the first section forming the laser beam combination from the initial beam and directing the laser beam combination from the first section toward a second section of the adaptive phase altering optical element, the second section phase altering the first beam and the second beam of the laser beam combination.

A twenty-fifth aspect of the present disclosure includes the method of the twenty-fourth aspect, wherein the first section of the adaptive phase altering optical element comprises a beam splitting phase mask configured to split the initial beam into the laser beam combination and the second section of the adaptive phase altering optical element comprises a first quasi-non-diffracting phase mask configured to apply an aberration corrected quasi-non-diffracting phase and a prism phase to the first beam of the laser beam combination and a second quasi-non-diffracting phase mask configured to apply a quasi-non-diffracting phase to the second beam of the laser beam combination.

A twenty-sixth aspect of the present disclosure includes the method of the twenty-fourth aspect or the twenty-fifth aspect, wherein the first section and the second section of the adaptive phase altering optical element are laterally offset along a surface of the adaptive phase altering optical element and the first quasi-non-diffracting phase mask and the second quasi-non-diffracting phase mask of the second section are laterally offset along the surface of the adaptive phase altering optical element.

A twenty-seventh aspect of the present disclosure includes the method of any of the previous aspects, further including translating at least one of the transparent workpiece and the laser beam combination relative to each other along a contour line to form a contour comprising a plurality of defects in the transparent workpiece.

A twenty-eighth aspect of the present disclosure includes the method of the twenty-seventh aspect, wherein the contour line comprises a curved contour line, the contour comprises a curved contour, and the method further comprises rotating the laser beam combination while translating at least one of the transparent workpiece and the laser beam combination relative to each other along the curved contour line such that each defect of the plurality of defects is directed radially inward or radially outward relative the curved contour line.

A twenty-ninth aspect of the present disclosure includes the method of the twenty-eighth aspect, wherein the curved contour line comprises a closed curved contour line and the curved contour comprises a closed curved contour.

A thirtieth aspect of the present disclosure includes the method of any of the twenty-seventh aspect through the twenty-ninth aspect, further including applying a stress to the contour to separate the transparent workpiece along the contour.

A thirty-first aspect of the present disclosure includes the method of the thirtieth aspect, wherein the stress comprises a thermal stress, a mechanical stress, or a combination thereof.

A thirty-second aspect of the present disclosure includes the method of any of the previous aspects, wherein the first beam of the laser beam combination is output by a first beam source and the second beam of the laser beam combination is output by a second beam source.

A thirty-third aspect of the present disclosure includes the method of any of the previous aspects, wherein the laser beam combination is formed from an initial beam comprising a pulsed laser beam output by a beam source that produces pulse bursts comprising 2 sub-pulses per pulse burst or more.

A thirty-fourth aspect of the present disclosure includes the method of any of the previous aspects, wherein a spacing between adjacent defects is 50 μm or less.

A thirty-fifth aspect of the present disclosure includes the method of any of the previous aspects, wherein the transparent workpiece comprises an alkali aluminosilicate glass material.

A thirty-sixth aspect of the present disclosure includes the method of any of the previous aspects, wherein the first laser beam focal line and the second laser beam focal line each comprise a circular angular spectrum.

A thirty-seventh aspect of the present disclosure includes the method of any of the previous aspects, wherein the first chamfer angle is greater than 5°.

A thirty-eighth aspect of the present disclosure includes the method of any of the previous aspects, wherein the second chamfer angle is less than 5°.

A thirty-ninth aspect of the present disclosure includes the method of any of the previous aspects, wherein the first chamfer angle is greater than 10°.

A fortieth aspect of the present disclosure includes the method of any of the previous aspects, wherein the first chamfer angle is greater than 20°.

According to forty-first aspect of the present disclosure, a phase altering optical element that includes a diffractive optical element comprising a first diffraction region that is laterally offset from a second diffraction region along a surface of the diffractive optical element, the first diffraction region is configured to apply an aberration corrected quasi-non-diffracting phase and a prism phase to a first beam of a laser beam combination, and the second diffraction region is configured to apply a quasi-non-diffracting phase to a second beam of the laser beam combination.

A forty-second aspect of the present disclosure includes the phase altering optical element of the forty-first aspect, wherein the first diffraction region comprises a first annular diffraction region and the second diffraction region comprises a second annular diffraction region.

A forty-third aspect of the present disclosure includes the phase altering optical element of the forty-first aspect or the forty-second aspect, wherein the first diffraction region comprises a first filled diffraction region and the second diffraction region comprises a second filled diffraction region.

A forty-fourth aspect of the present disclosure includes the phase altering optical element of any of the forty-first aspect through the forty-third aspect, wherein the diffractive optical element further comprises a third diffraction region laterally offset from the first diffraction region and the second diffraction region along the surface of the diffractive optical element such that the second diffraction region is positioned between the first diffraction region and the third diffraction region.

A forty-fifth aspect of the present disclosure includes the phase altering optical element of the forty-fourth aspect, wherein the first diffraction region comprises a first filled diffraction region and the second diffraction region comprises a second filled diffraction region.

A forty-sixth aspect of the present disclosure includes the phase altering optical element of any of the forty-first aspect through the forty-fifth aspect, wherein the first diffraction region and the second diffraction region each comprise a variable thickness comprising periodic protrusions, periodic depressions, or a combination thereof.

According to a forty-seventh aspect of the present disclosure, a method of processing a transparent workpiece that includes simultaneously refracting a laser beam combination at an impingement surface of the transparent workpiece, the laser beam combination comprising a first beam and a second beam. The first beam forms a first laser beam focal line in the transparent workpiece and generates a first induced absorption to produce a first defect segment within the transparent workpiece, the first defect segment having a first chamfer angle and the second beam forms a second laser beam focal line and generates a second induced absorption to produce a second defect segment within the transparent workpiece, the second defect segment having a second chamfer angle, the second chamfer angle differing from the first chamfer angle.

A forty-eighth aspect of the present disclosure includes the phase altering optical element of the forty-seventh aspect, wherein the first chamfer angle is greater than 5° relative to a plane orthogonal to the impingement surface.

A forty-ninth aspect of the present disclosure includes the phase altering optical element of the forty-seventh aspect or the forty-eighth aspect, wherein the first laser beam focal line and the second laser beam focal line each comprise a circular angular spectrum.

A fiftieth aspect of the present disclosure includes the phase altering optical element of any of the forty-seventh aspect through the forty-ninth aspect, wherein the first beam refracts at a first impingement location of the impingement surface and the second beam refracts at a second impingement location of the impingement surface that is laterally offset from the first impingement location along the impingement surface.

A fifty-first aspect of the present disclosure includes the phase altering optical element of any of the forty-seventh aspect through the fiftieth aspect, wherein the second laser beam focal line comprises a chamfer angle greater than 5° relative to a plane orthogonal to the impingement surface at a second impingement location.

A fifty-second aspect of the present disclosure includes the phase altering optical element of any of the forty-seventh aspect through the fifty-first aspect, wherein the second chamfer angle is less than 1° relative to a plane orthogonal to the impingement surface at a second impingement location.

A fifty-third aspect of the present disclosure includes the phase altering optical element of any of the forty-seventh aspect through the fifty-second aspect, wherein the laser beam combination comprises a third beam and wherein upon simultaneously refracting the laser beam combination at the impingement surface of the transparent workpiece, the third beam forms a third laser beam focal line and generates a third induced absorption to produce a third defect segment within the transparent workpiece, the third defect segment having a third chamfer angle, the second chamfer angle differing from the third chamfer angle.

A fifty-fourth aspect of the present disclosure includes the phase altering optical element of the fifty-third aspect, wherein the first laser beam focal line extends between the impingement surface and a first termination depth within the transparent workpiece and terminates at a first termination location positioned at the first termination depth, the second laser beam focal line extends from the first termination location positioned at the first termination depth to a second termination location positioned at a second termination depth within the transparent workpiece, where the first termination depth is closer to the impingement surface than the second termination depth, and the third laser beam focal line extends from the second termination location toward a second surface of the transparent workpiece.

A fifty-fifth aspect of the present disclosure includes the phase altering optical element of the fifty-fourth aspect, wherein the third laser beam focal line reaches the second surface at an exit location, wherein the exit location is positioned along the plane orthogonal to the impingement surface at a first impingement location.

A fifty-sixth aspect of the present disclosure includes the phase altering optical element of any of the forty-seventh aspect through the fifty-fifth aspect, wherein both the first laser beam focal line and the second laser beam focal line comprise a wavelength $\lambda$, a spot size $w_o$, and a Rayleigh range $Z_R$ that is greater than $$F_D \frac{\pi w_o^2}{\lambda},$$

where $F_D$ is a dimensionless divergence factor and the refracting increases the dimensionless divergence factor $F_D$ by a factor of at least 10.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1A:
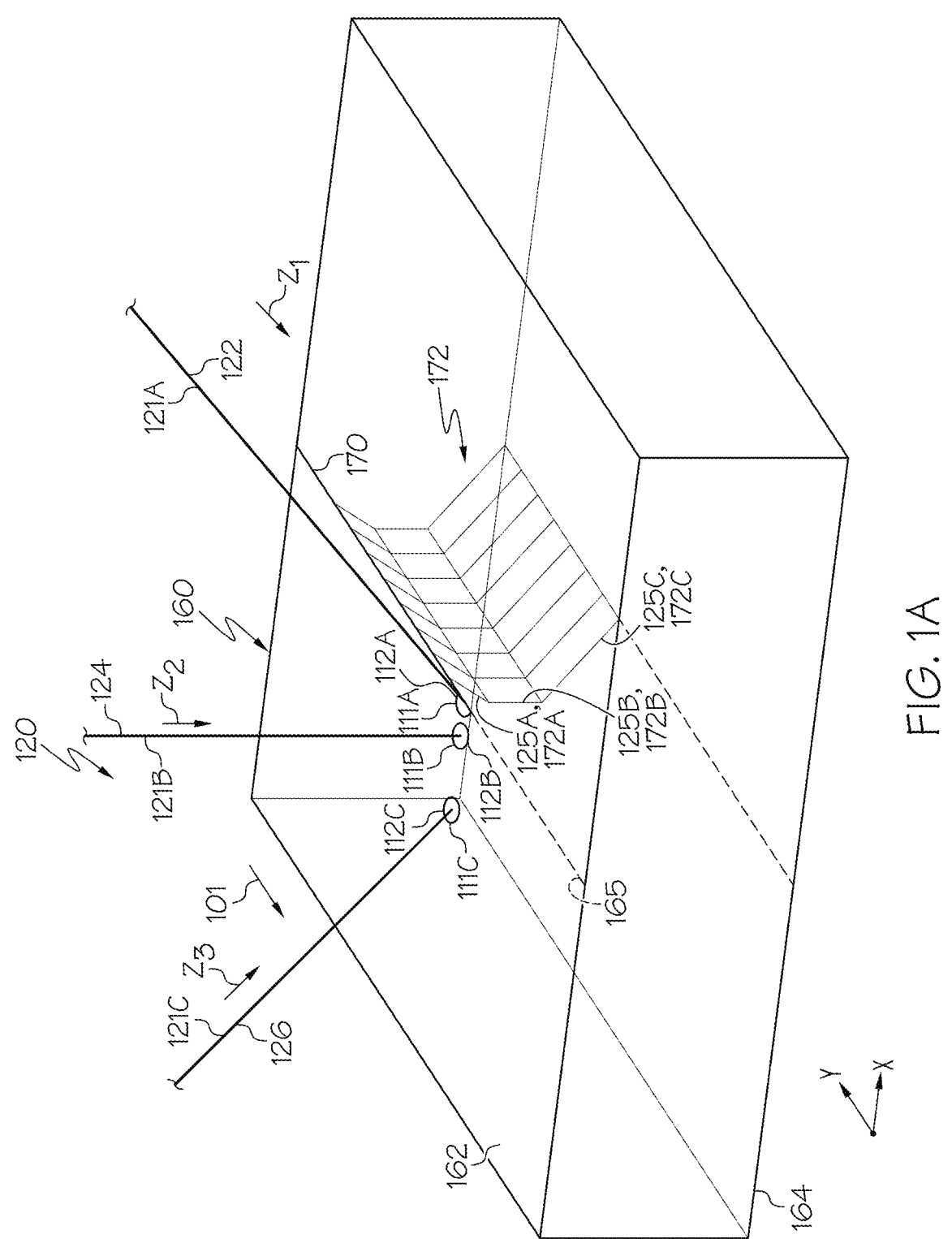
FIG. 1A schematically depicts a perspective view of an embodiment of laser forming a contour of defects in a transparent workpiece, according to one or more embodiments described herein.
Figure 1B:
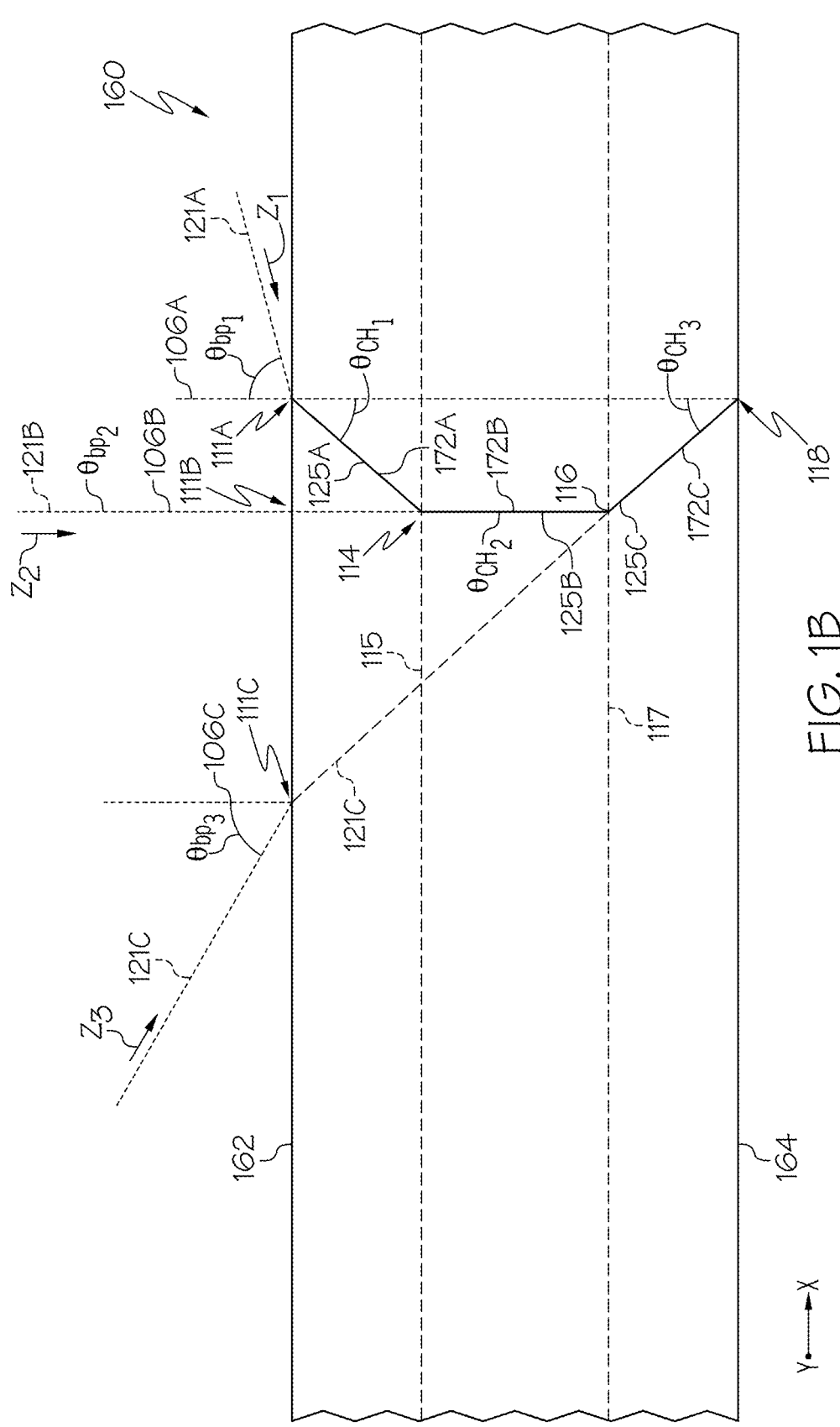
FIG. 1B schematically depicts a side view of an embodiment of laser forming the contour of defects in the transparent workpiece, according to one or more embodiments described herein.
Figure 3A:
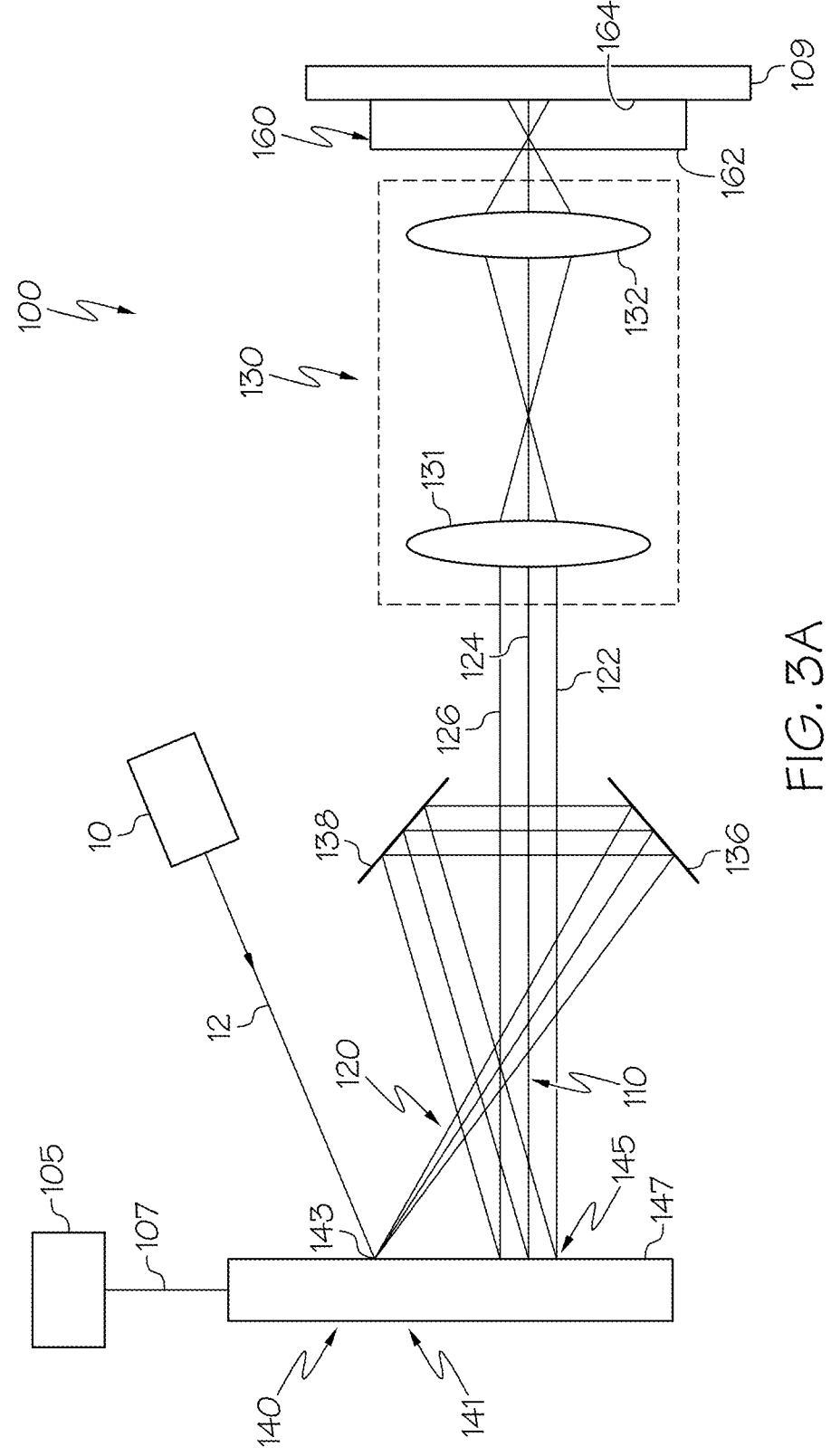
FIG. 3A schematically depicts an optical assembly for laser processing a transparent workpiece including a beam source, an adaptive phase altering optical element and a lens assembly, according to one or more embodiments described herein.
Figure 3B:
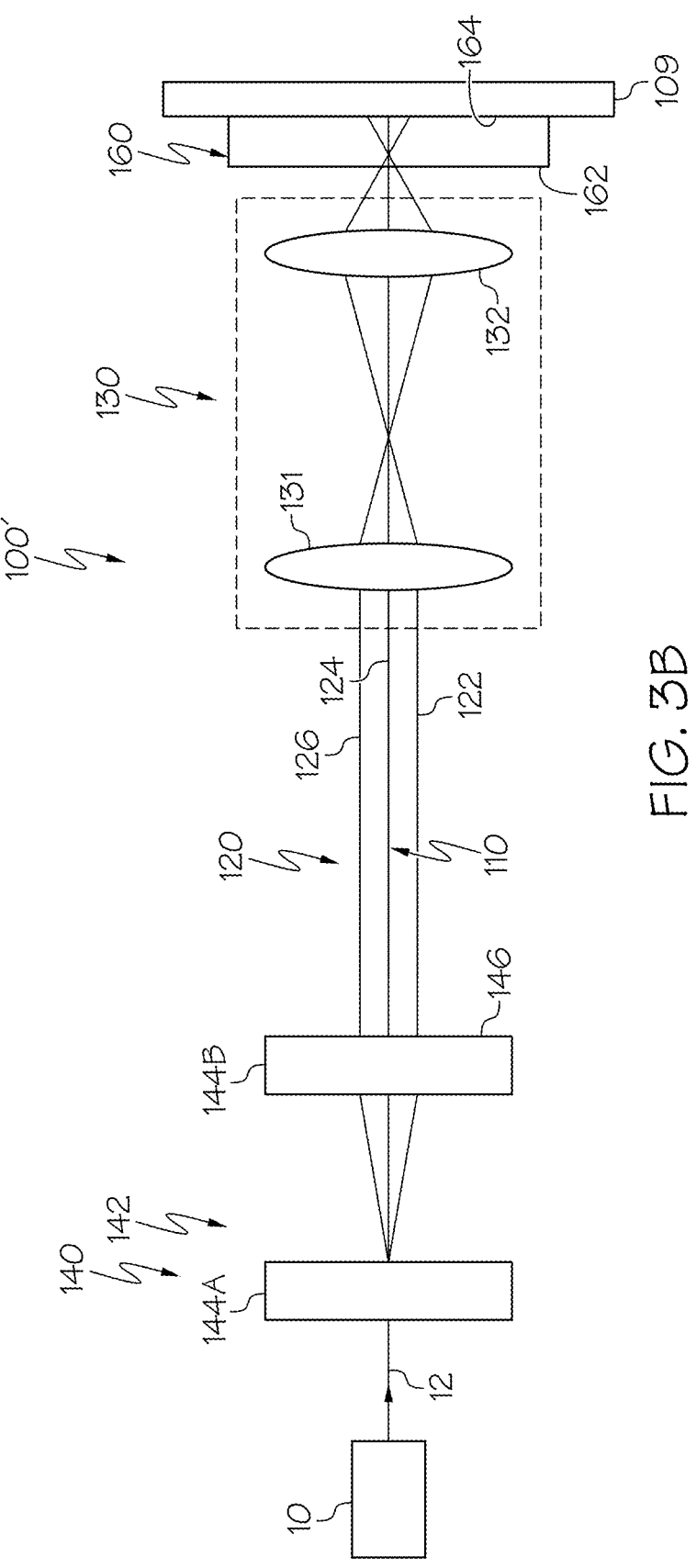
FIG. 3B schematically depicts an optical assembly for laser processing a transparent workpiece including a beam source, a static phase altering optical element and a lens assembly, according to one or more embodiments described herein.
Figure 6B:
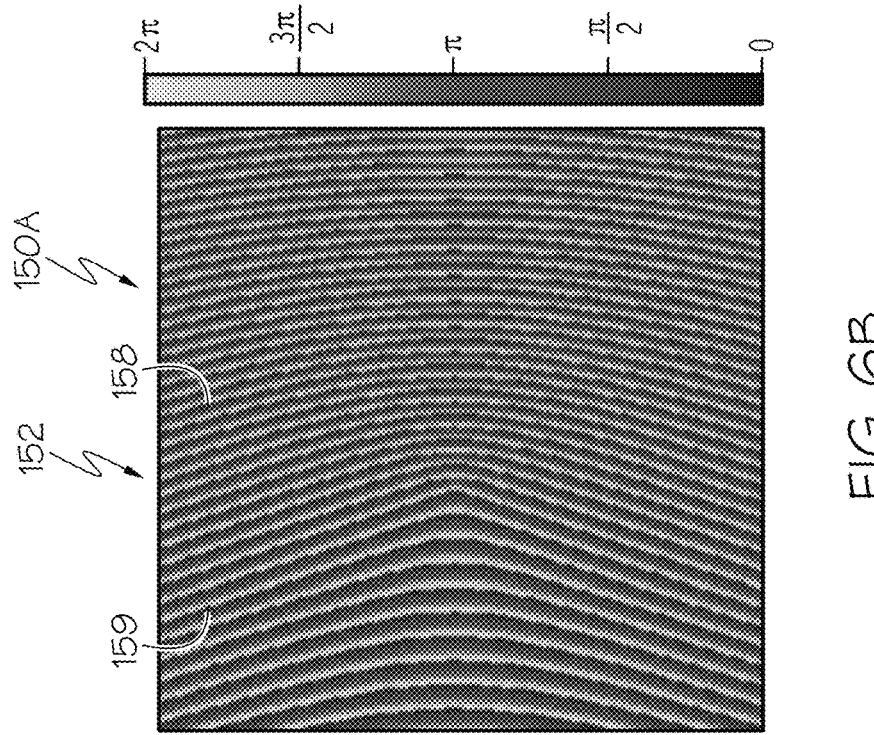
FIG. 6B schematically depicts a phase mask used to phase alter the first beam and form the oblong angular spectrum of FIG. 6A, according to one or more embodiments shown and described herein.
Figure 6A:
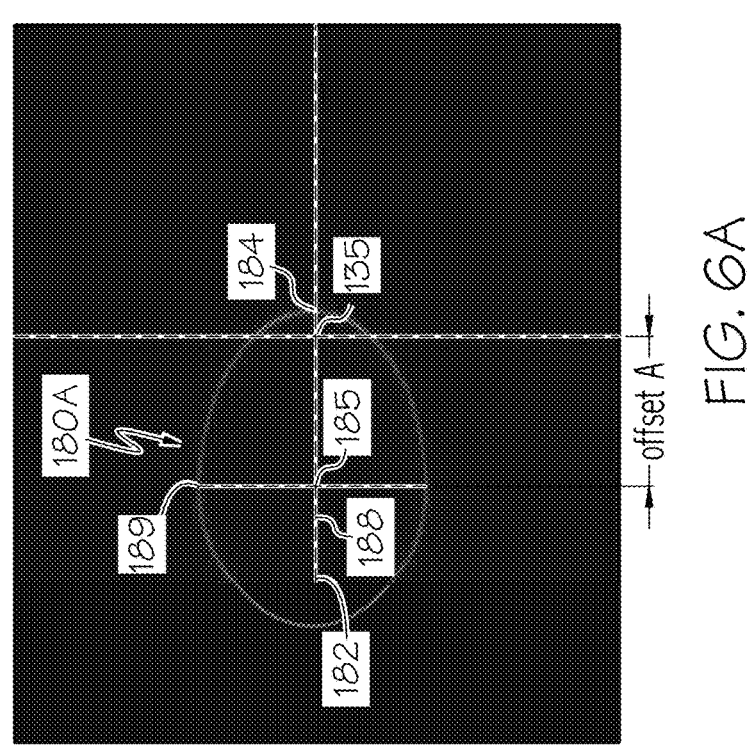
FIG. 6A schematically depicts an oblong angular spectrum of the first beam of the laser beam combination of FIG. 1B after phase altering the laser beam combination, according to one or more embodiments shown and described herein.
Figure 6C:
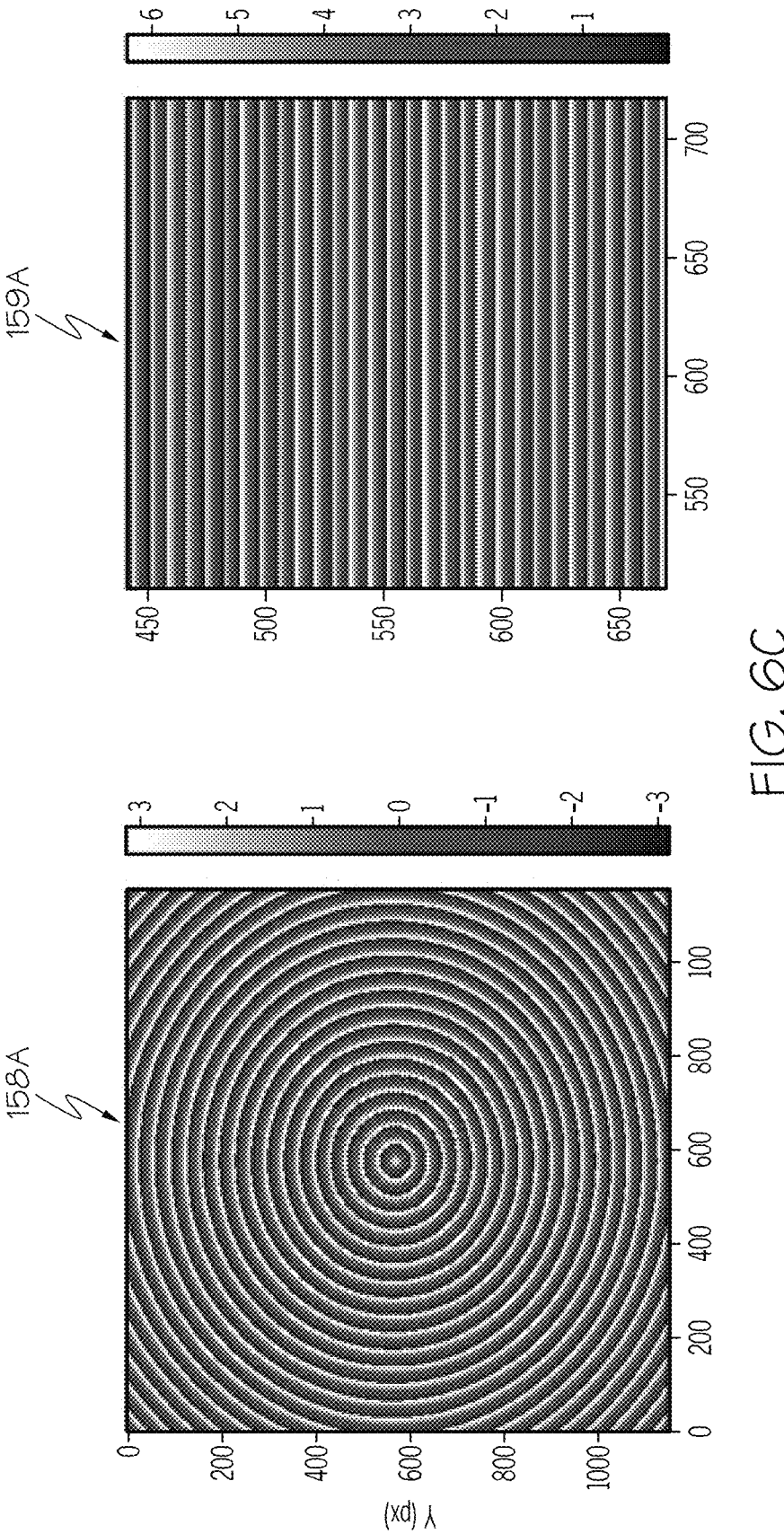
FIG. 6C schematically depicts a partial phase mask with a plurality of phase rings and a partial phase mask with a prism phase, according to one or more embodiments shown and described herein.
Figure 6E:
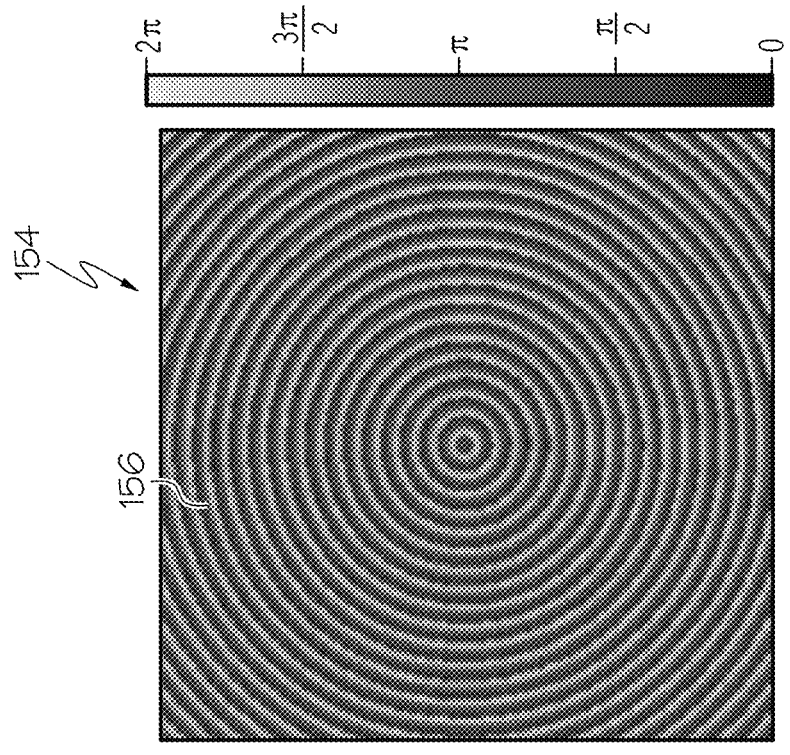
FIG. 6D schematically depicts a circular angular spectrum of the second beam of the laser beam combination of FIG.
Figure 6D:
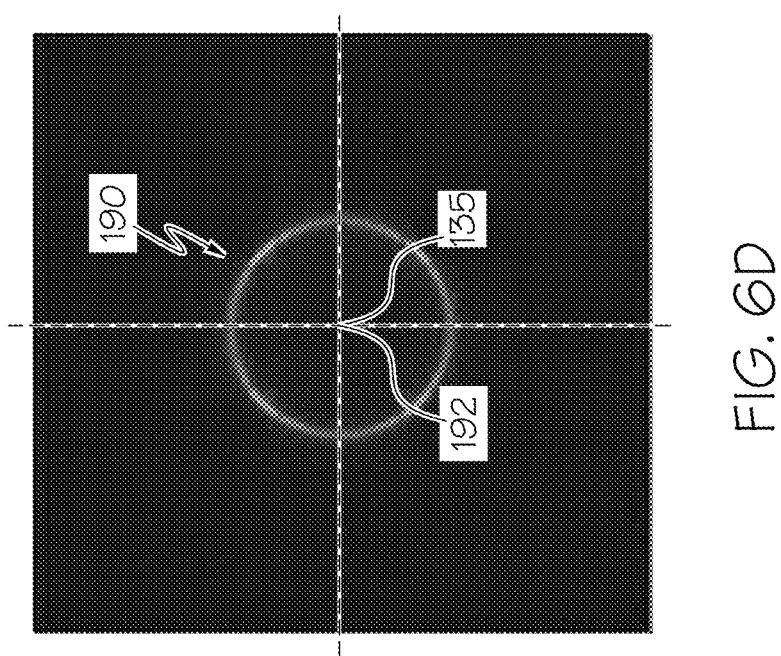
Figure 6G:
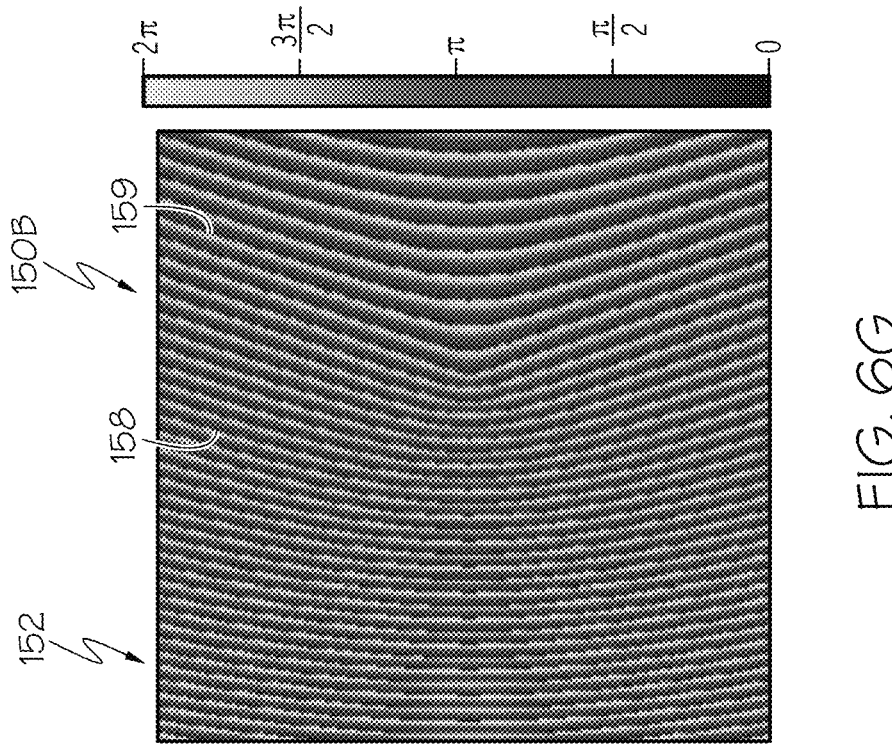
Figure 6F:
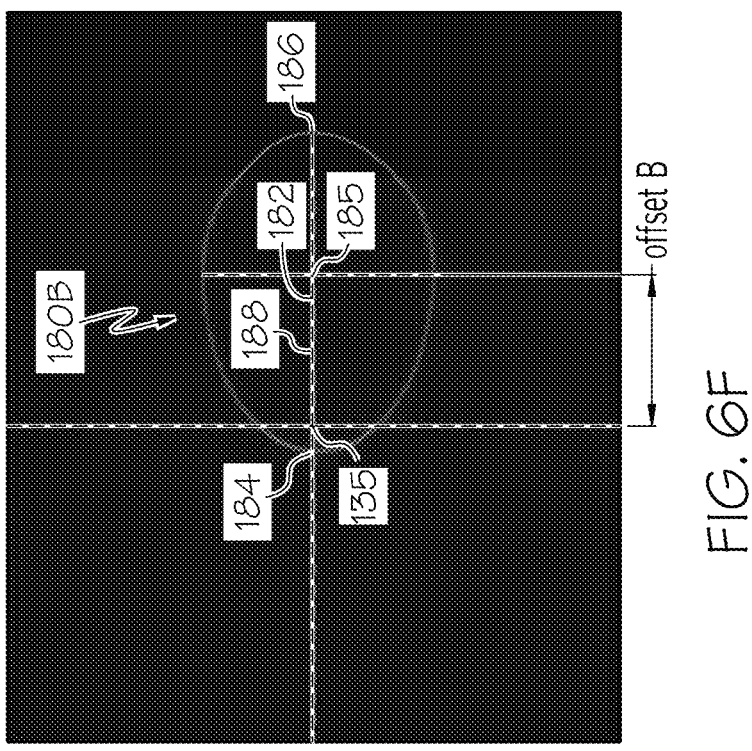
Figure 7B:
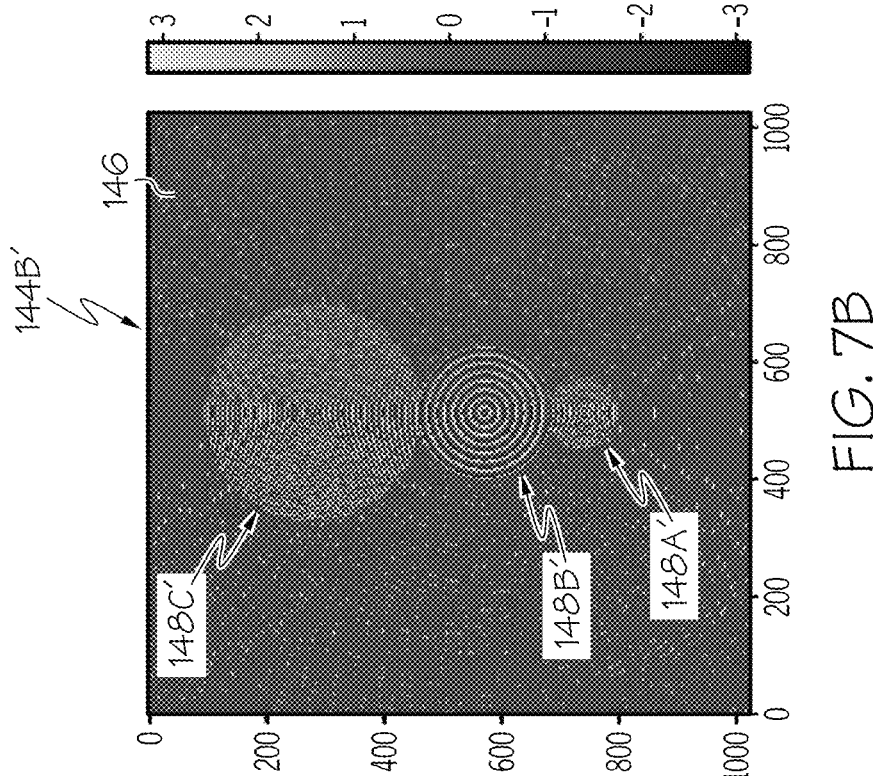
Figure 7A:
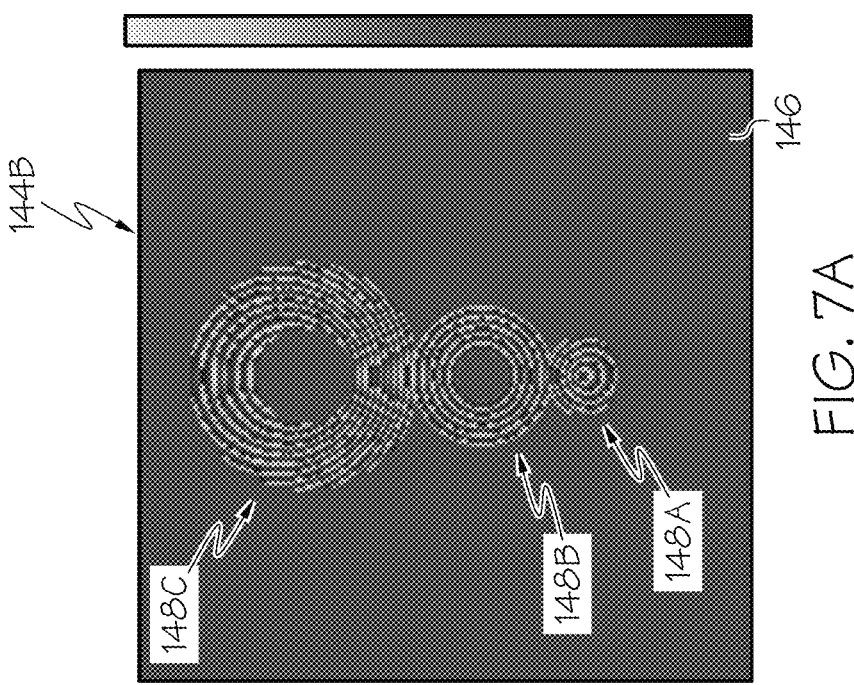
Figure 8:
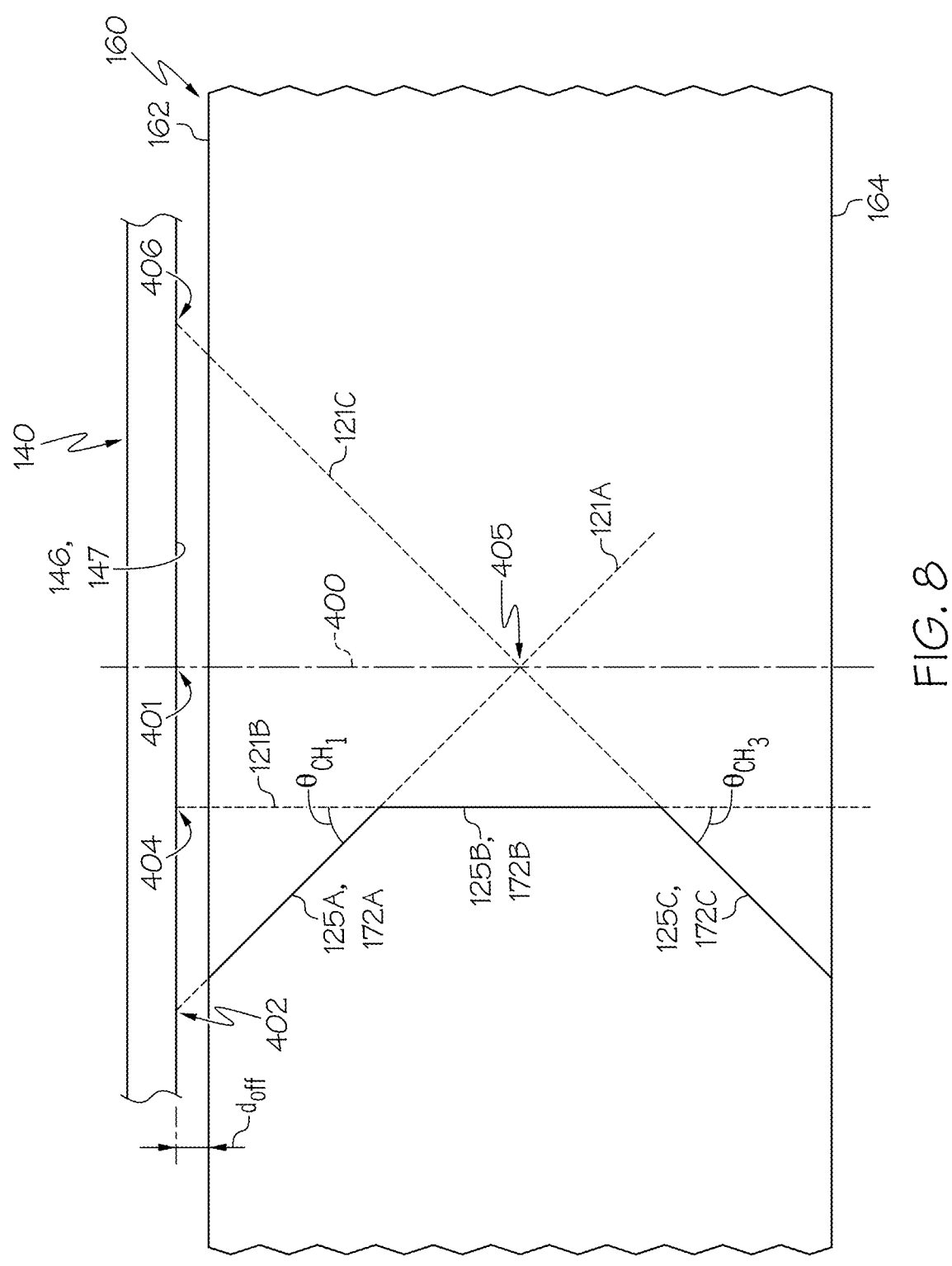
Figure 9B:
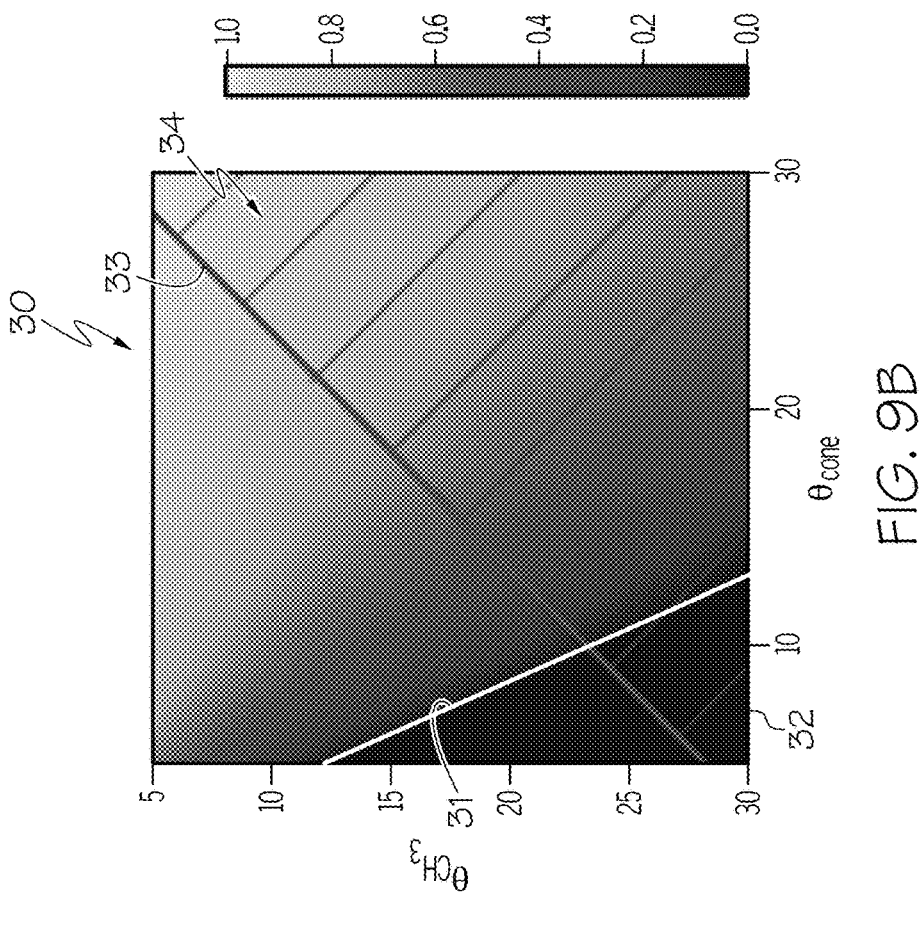
Figure 9A:
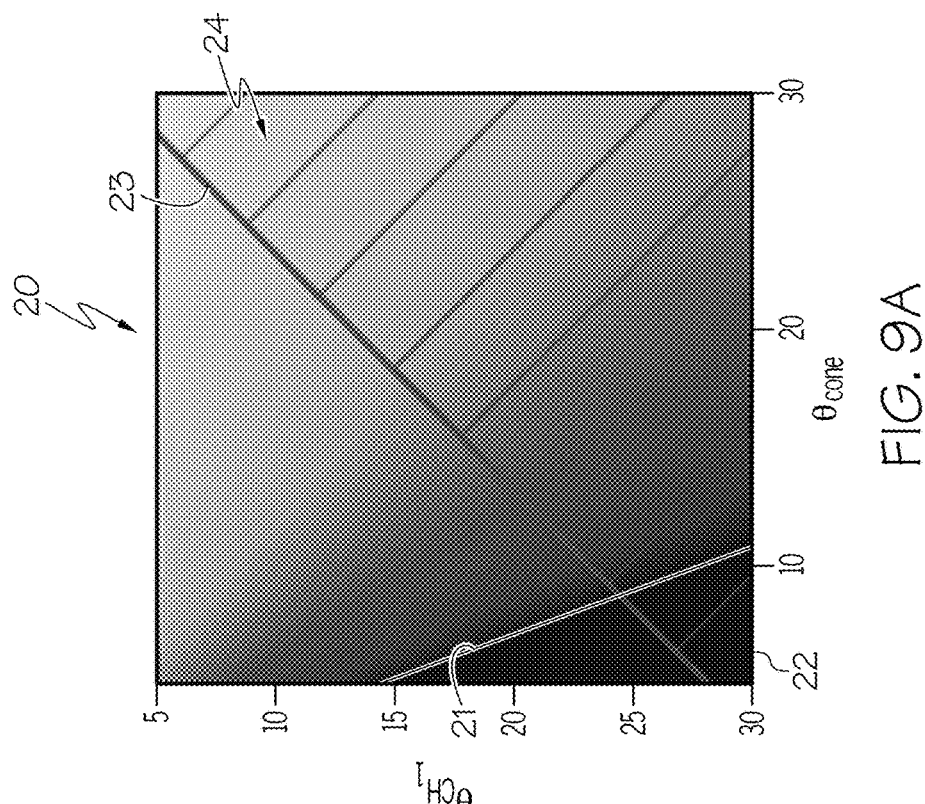
Figures 10A, 10B:
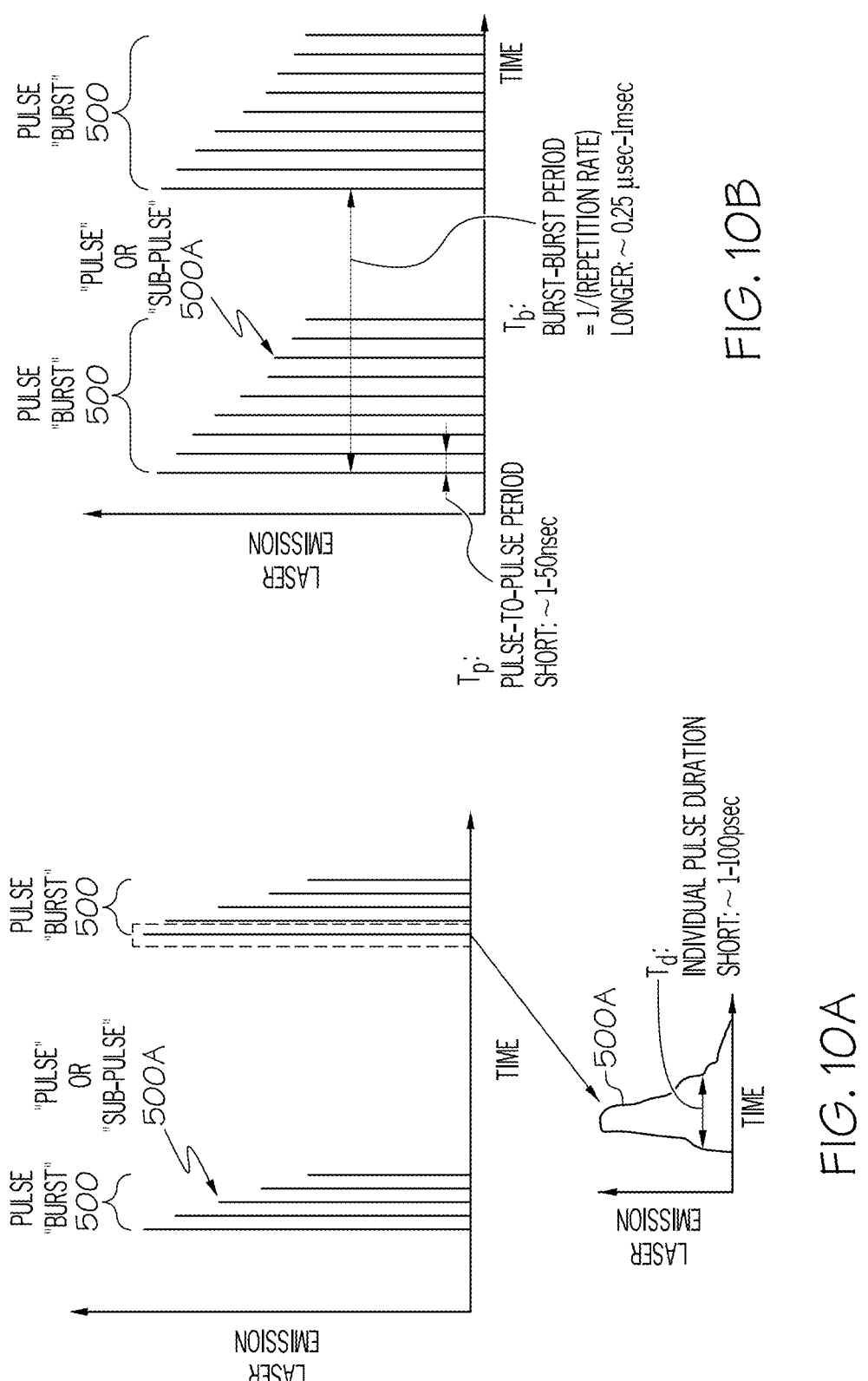
Figure 10C:
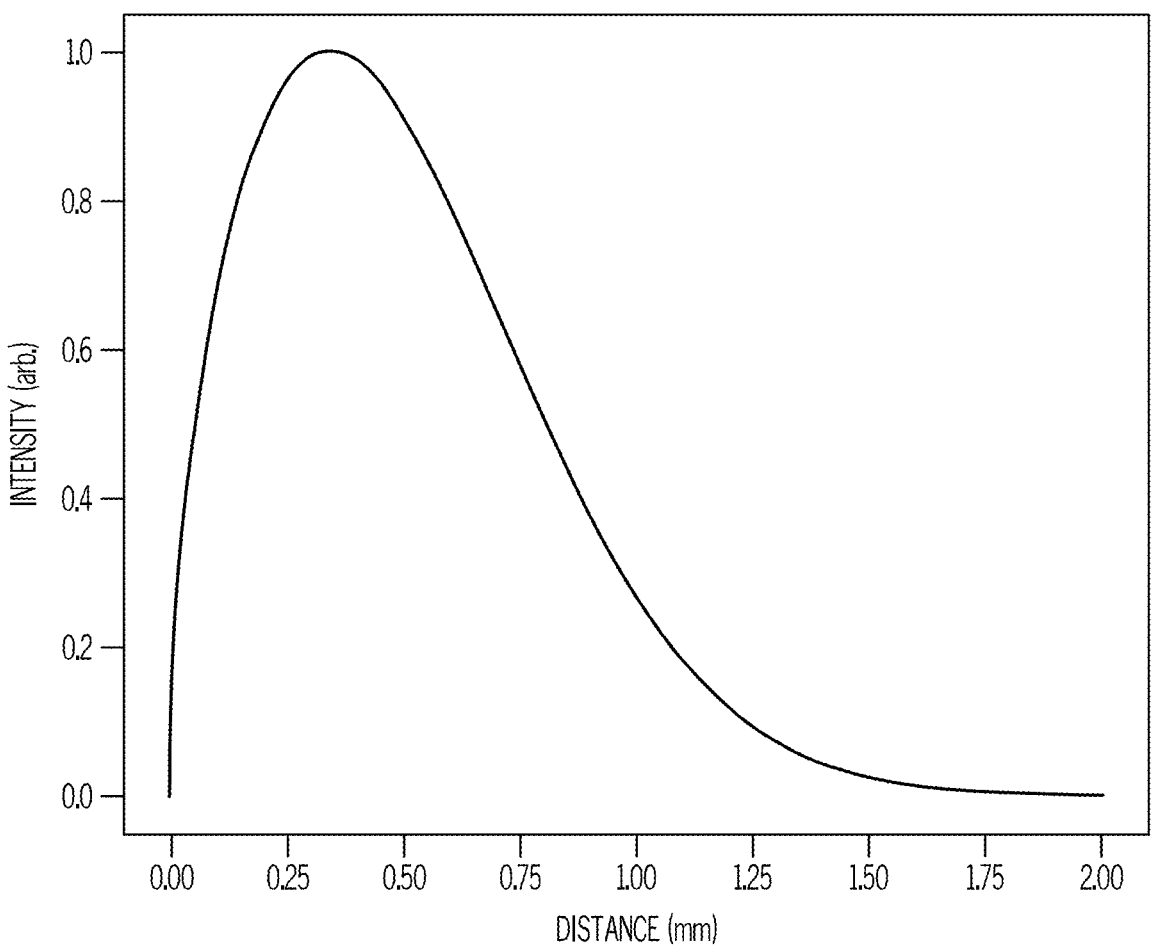
Figure 11A:
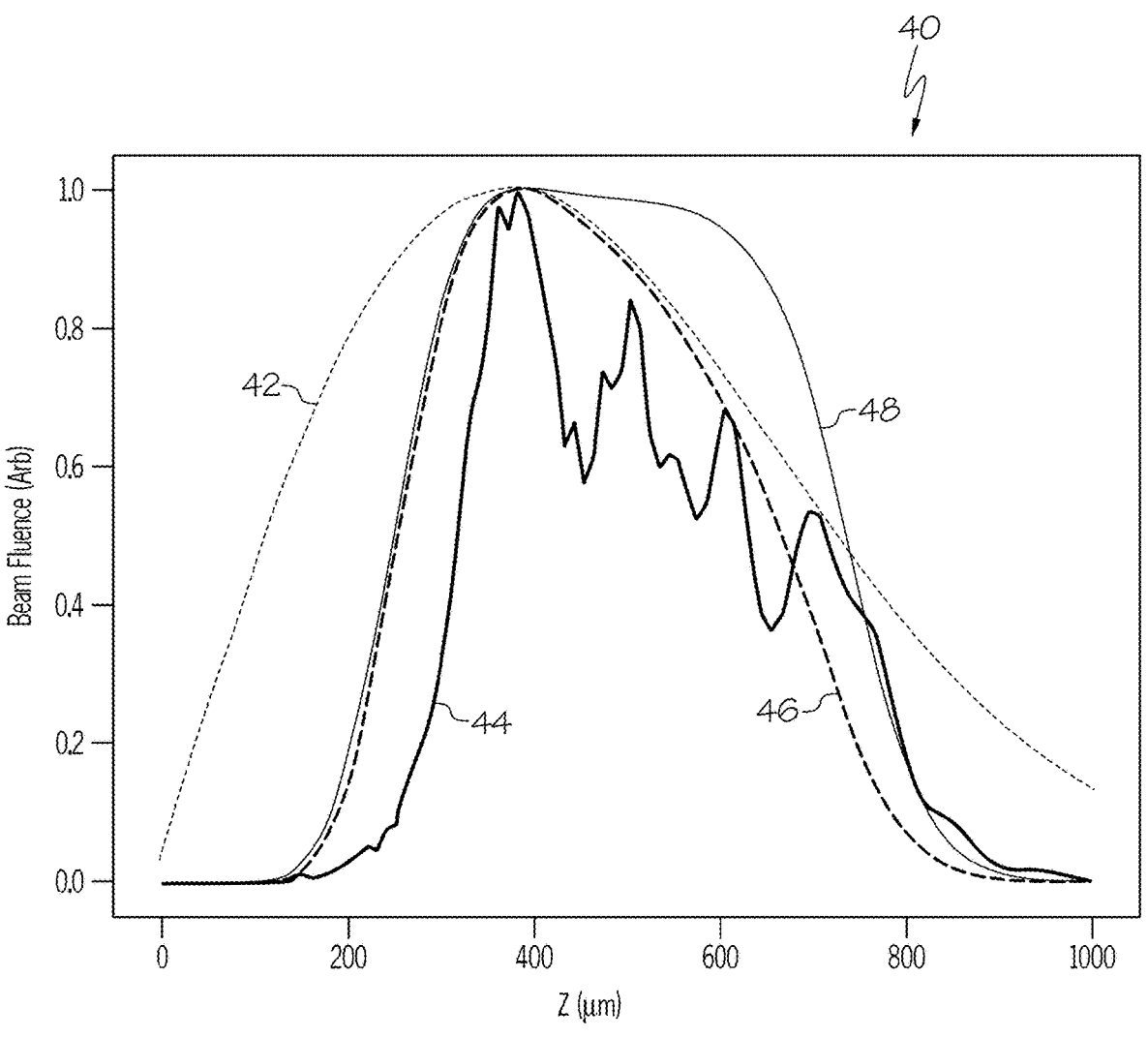
Figure 11C:
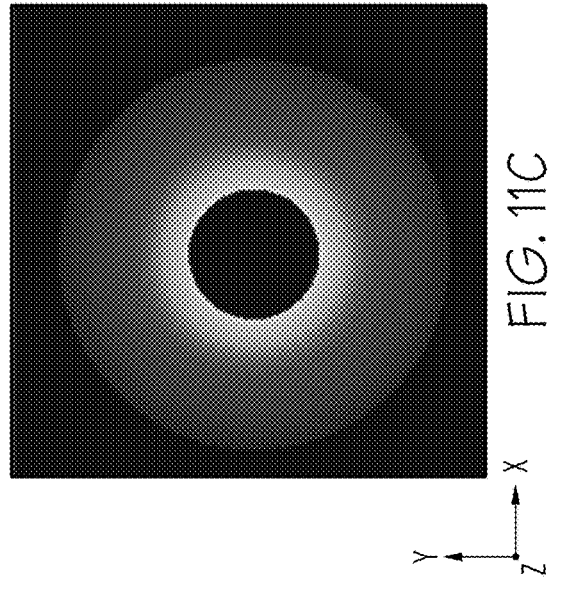
Figure 11E:
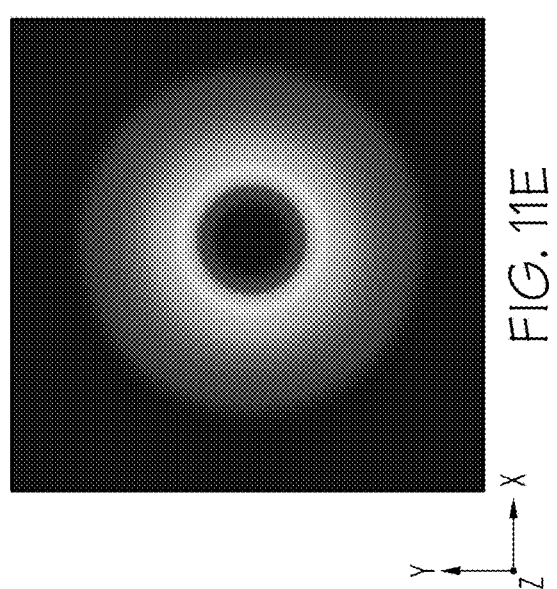
Figure 11B:
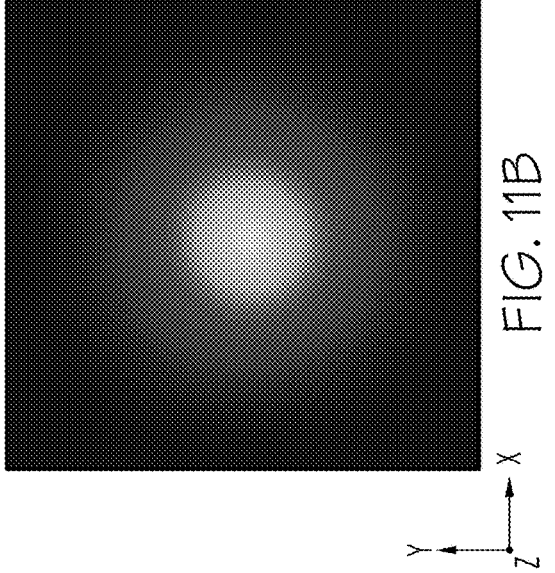
Figure 11D:
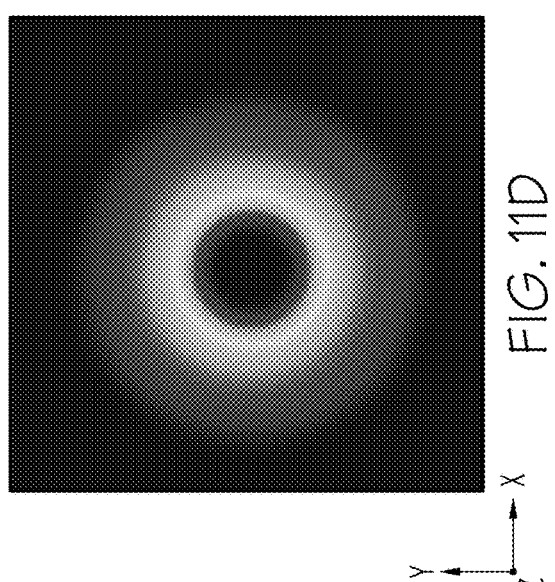
Figures 12A, 12B:
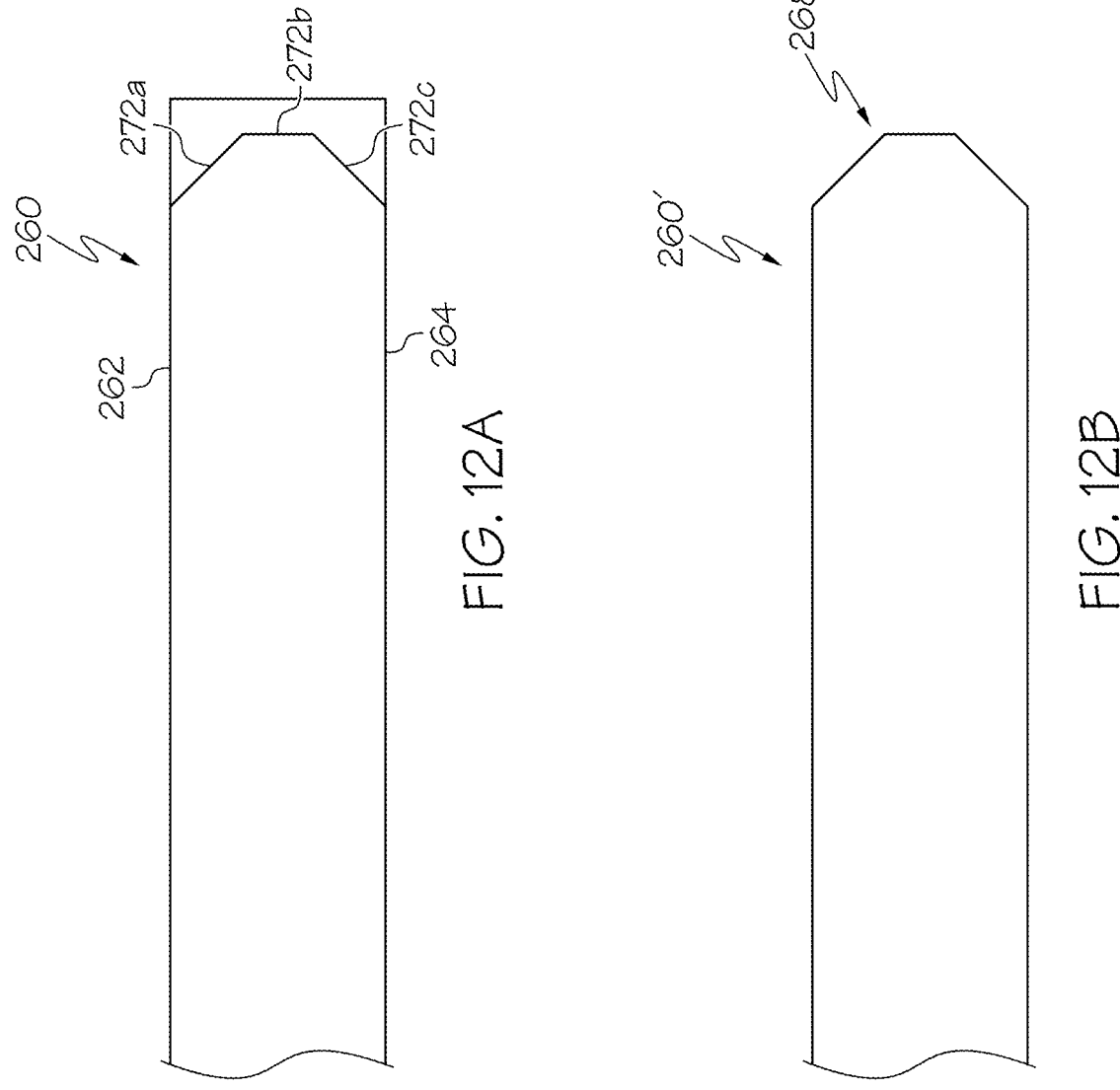
Figure 13:
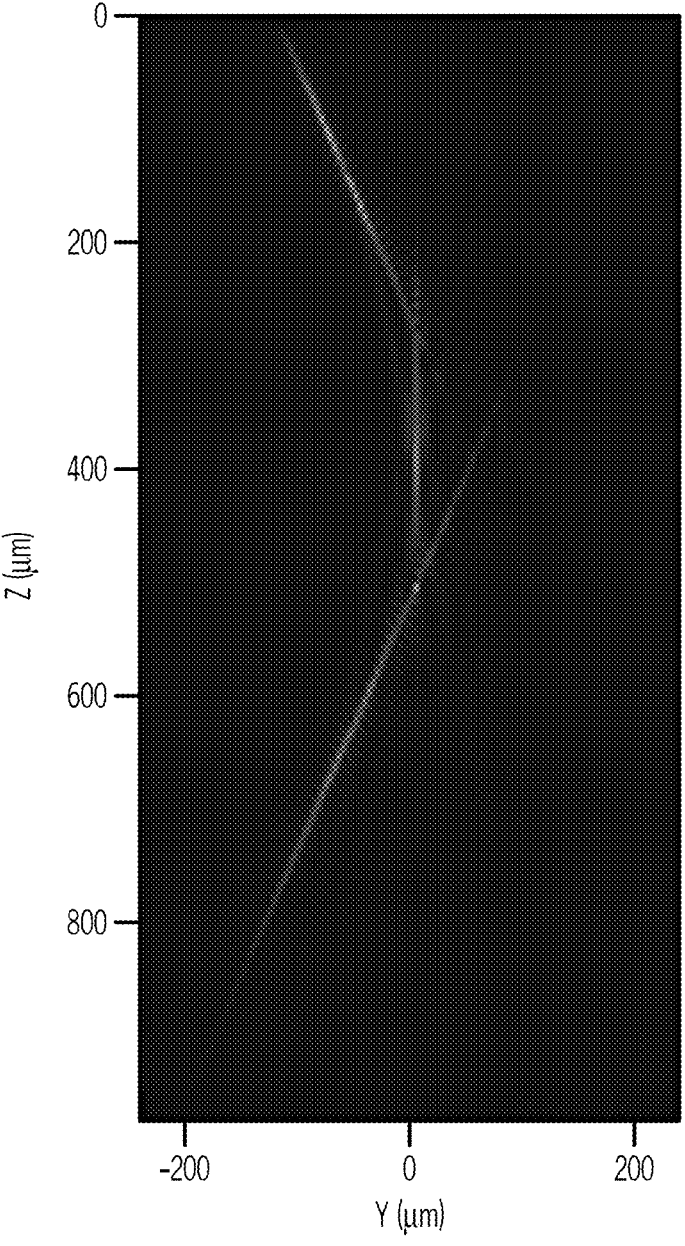
Figure 14:
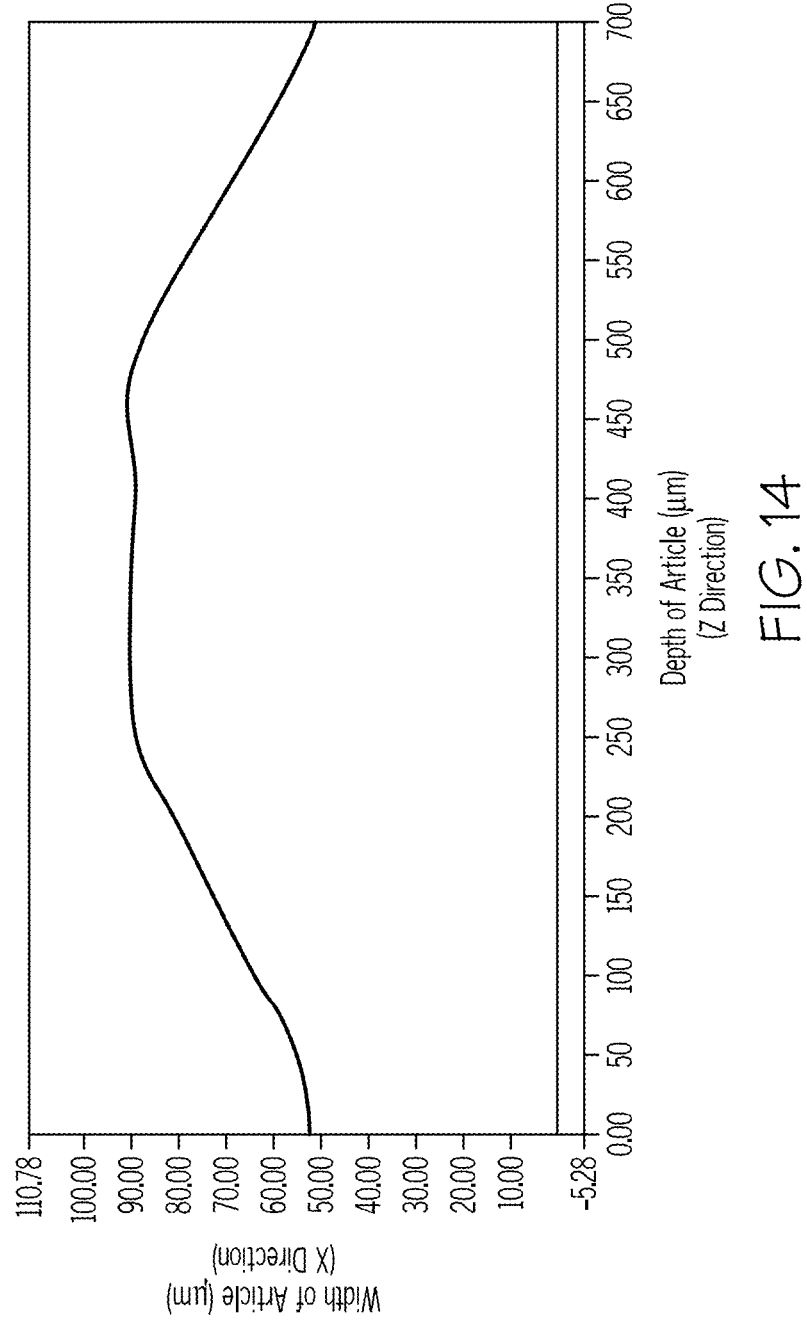

1B after phase altering the laser beam combination, according to one or more embodiments shown and described herein;

FIG. 6E schematically depicts a phase mask used to phase alter the second beam and form the circular angular spectrum of FIG. 6D, according to one or more embodiments shown and described herein;

FIG. 6F schematically depicts an oblong angular spectrum of the third beam of the laser beam combination of FIG. 1B after phase altering the laser beam combination, according to one or more embodiments shown and described herein;

FIG. 6G schematically depicts a phase mask used to phase alter the third beam and form the oblong angular spectrum of FIG. 6F, according to one or more embodiments shown and described herein;

FIG. 7A schematically depicts a surface of the static phase altering optical element of FIG. 3B comprising a first diffractive region, a second diffractive region, and a third diffractive region, according to one or more embodiments shown and described herein;

FIG. 7B schematically depicts a surface of another version of the static phase altering optical element of FIG. 3B comprising a first diffractive region, a second diffractive region, and a third diffractive region, according to one or more embodiments shown and described herein;

FIG. 8 schematically depicts the lateral arrangement of the first beam, the second beam, and the third beam of the laser beam combination at a surface of a phase modified optical element, according to one or more embodiments shown and described herein;

FIG. 9A graphically depicts a magnitude of overlap between the first beam and the second beam of the laser beam combination as a function of cone angle and chamfer angle, according to one or more embodiments shown and described herein;

FIG. 9B graphically depicts a magnitude of overlap between the third beam and the second beam of the laser beam combination as a function of cone angle and chamfer angle, according to one or more embodiments shown and described herein;

FIG. 10A graphically depicts the relative intensity of laser pulses within an exemplary pulse burst vs. time, according to one or more embodiments described herein;

FIG. 10B graphically depicts relative intensity of laser pulses vs. time within another exemplary pulse burst, according to one or more embodiments described herein;

FIG. 10C graphically depicts intensity of laser pulses vs. distance, according to one or more embodiments described herein;

FIG. 11A graphically depicts maximum beam intensity as a function of propagation distance for laser beam focal lines formed using a variety of input beams, according to one or more embodiments shown and described herein;

FIG. 11B graphically depicts a cross-sectional intensity of a laser beam focal line formed from a Gaussian initial beam, according to one or more embodiments shown and described herein;

FIG. 11C graphically a cross-sectional intensity of a laser beam focal line formed from an annular Gaussian initial beam, according to one or more embodiments shown and described herein;

FIG. 11D graphically depicts a cross-sectional intensity of a laser beam focal line formed from an annular super Gaussian initial beam, according to one or more embodiments shown and described herein;

FIG. 11E graphically depicts a cross-sectional intensity of a laser beam focal line formed from an annular super Gaussian initial beam with a 1/R intensity profile, according to one or more embodiments shown and described herein;

FIG. 12A schematically depicts a side view of a transparent workpiece having a contour of C-chamfered defects, according to one or more embodiments described herein;

FIG. 12B schematically depicts a side view of two separated articles formed from the transparent workpiece of FIG. 12A, each separated article comprising a C-chamfered edge, according to one or more embodiments shown and described herein;

FIG. 13 depicts a side view of the first, second, and third laser beam focal lines forming a C-chamfered shape in a transparent workpiece, according to one or more embodiments shown and described herein; and FIG. 14 depicts a surface profile of a C-chamfered edge on a separated article, according to one or more embodiments shown and described herein.

DETAILED DESCRIPTION

Reference will now be made in detail to embodiments of processes for laser processing transparent workpieces, such as glass workpieces, examples of which are illustrated in the accompanying drawings. Whenever possible, the same reference numerals will be used throughout the drawings to refer to the same or like parts.

According to one or more embodiments described herein, a transparent workpiece may be laser processed to form a contour in the transparent workpiece that comprises a series of defects along a line of intended separation for separating the transparent workpiece into two or more separated articles. In embodiments, each of the defects comprise a first defect segment and a second defect segment, where the first defect segment comprises a chamfer angle of greater than 5° such that, after separation of the transparent workpiece along the contour, the resultant separated articles comprise an angled edge portion having an edge angle of greater than 5°. In the embodiments described herein, the chamfer angle of the defect segments is measured relative to a plane orthogonal to an impingement surface of the transparent workpiece in either a clockwise or counterclockwise rotational direction. Moreover, in some embodiments, the second defect segment comprises a chamfer angle of less than 1°, such as 0° and the defects also include a third defect segment which comprises a chamfer angle of greater than 5°. Thus, the resultant separated articles may comprise a straight edge portion between two opposite angled portions, that is, a C-chamfered edge. Defects may be formed in a transparent workpiece using a low diffracting beam, such as a quasi-non-diffracting beam, focused into a laser beam focal line.

Using current methods, diffraction and divergence of conventional extended focus laser beams (e.g., quasi-non-diffracting beams) that do not use the phase alterations described in this disclosure, increases when the beam is directed into the transparent workpiece at increased angles relative to normal incidence (e.g., angles greater than 5° from normal incidence) and as such, it is difficult to form a series of high angle defects to facilitate the separation of transparent workpieces into separated articles having angled edges. For example, using previous laser processing techniques, when a laser beam enters a transparent workpiece with an angled, curved, or stepped face, aberrations are introduced into the beam. For Bessel beams, these aberrations result in a large decrease of peak beam intensity as the beam travels inside the transparent workpiece, diminishing the quality or even preventing the formation of high angle defects. While not intending to be limited by theory, peak beam intensity decreases because, in conventional angled cutting, the central lobe of a standard Bessel beam splits into multiple lobes and thus the peak intensity of any of the split lobes is less than the peak intensity of the central lobe of a non-aberrated Bessel beam. While still not intending to be limited by theory, aberrations also lead to a decrease in the Rayleigh range of the beam. Thus, improved methods of laser processing transparent workpieces are desired. Accordingly, the methods described herein use angled laser beam focal lines that are phase altered such that the laser beam focal lines exhibit minimal divergence along the length of the laser beam focal line within the transparent workpiece to form a contour of high angled defects and facilitate the formation of separated articles having angled edges. Moreover, the methods described herein use a laser beam combination that comprises multiple beams, each phase altered to form localized laser beam focal lines that exhibit minimal divergence within the transparent workpiece. These simultaneously formed localized laser beam focal lines may each have different angles and may simultaneously form defects having defect segments with a variety of angles. This facilitates the formation of separated articles with complex edges having one or more angled portions, such as C-chamfered edges. Moreover, because each defect segment is formed simultaneously, the processing times of the methods described herein may be reduced when compared to techniques in which multiple passes are used to form the individual defect segments. The methods are described herein with specific references to the appended drawings.

As used herein, "laser processing" comprises directing a laser beam onto and/or into a transparent workpiece. In some embodiments, laser processing further comprises translating the laser beam relative to the transparent workpiece or translating the transparent workpiece relative to the laser beam, for example, along a contour line or other pathway. Examples of laser processing include using a laser beam to form a contour comprising a series of defects that extend into the transparent workpiece and/or using an infrared laser beam to heat the transparent workpiece. Laser processing may separate the transparent workpiece along one or more desired lines of separation. However, in some embodiments, additional non-laser steps, such as applying mechanical force, may be utilized to separate the transparent workpiece along one or more desired lines of separation.

As used herein, the "angular spectrum" of a laser beam refers to the distribution of the Fourier spectrum of the laser beam in the spatial frequency domain. In particular, the angular spectrum represents a group of plane waves whose summation recreates the original beam. The angular spectrum may also be referred to as the spatial-frequency distribution of the laser beam. As used herein, a "circular angular spectrum" is an angular spectrum whose peak intensity region forms a circular shape with a radius varying less than 5% relative to a central point of the circular angular spectrum, which is positioned at the propagation direction of the beam.

As used herein, "beam spot" refers to a cross section of a laser beam (e.g., a beam cross section) at the impingement location of the laser beam at an impingement surface of a transparent workpiece, i.e., the surface of a transparent workpiece upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component and a first position (location) is upstream from a second position (location) if the first position (location) is closer to the beam source along the path traversed by the laser beam than the second position (location).

As used herein, "beam pathway" refers to an alterable direction of travel of the laser beam. The beam pathway is determined by the direction of travel of the laser beam, and alters based on the positioning and direction of the laser beam.

As used herein, "laser beam focal line," refers to a pattern of interacting (e.g., crossing) light rays of a laser beam that forms a focal region elongated in the beam propagation direction. In conventional laser processing, a laser beam is tightly focused to a focal point. The focal point is the point of maximum intensity of the laser beam and is situated at a focal plane in a transparent workpiece. In the elongated focal region of a focal line, in contrast, the region of maximum intensity of the laser beam extends beyond a point to a line aligned with the beam propagation direction. A focal line is formed by converging light rays that intersect (e.g., cross) to form a continuous series of focal points aligned with the beam propagation direction. The laser beam focal lines described herein are formed using a quasi-non-diffracting beam, mathematically defined in detail below.

As used herein, "contour line," corresponds to the set of intersection points of the laser beam with the incident (impingement) surface of the transparent workpiece resulting from relative motion of the laser beam and the transparent workpiece. A contour line can be linear, angled, polygonal or curved in shape. A contour line can be closed (i.e. defining an enclosed region on the surface of the transparent workpiece) or open (i.e. not defining an enclosed region on the surface of the transparent workpiece). The contour line represents a boundary along which separation of the transparent workpiece into two or more parts is facilitated. Separation occurs spontaneously or with the assistance of external thermal or mechanical energy.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece and/or extend through one or more surfaces into the interior of the transparent workpiece. Defects may also extend through the entire thickness of the transparent workpiece. Separation of the transparent workpiece occurs by connecting defects along the contour, such as, for example, through propagation of a crack.

As used herein, a "defect" refers to a region of a transparent workpiece that has been modified by a laser beam focal line. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a laser beam focal line. Defects may also be referred to, in various embodiments herein, as defect lines or damage tracks. A defect or damage track is formed through interaction of a laser beam focal line with the transparent workpiece. As described more fully below, the laser beam focal line is produced by a pulsed laser. A defect at a particular location along the contour line is formed from a focal line produced by a single laser pulse at the particular location, by a pulse burst of sub-pulses at the particular location, or by multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the workpiece has a linear optical absorption of less than 20% per mm of material depth for the specified pulsed laser wavelength. In embodiments, the transparent workpiece has a linear optical absorption less than 10% per mm of material depth for the specified pulsed laser wavelength, or such as less than 1% per mm of material depth for the specified pulsed laser wavelength. Unless otherwise specified, the transparent workpiece has a linear optical absorption of less than about 20% per mm of material depth. The transparent workpiece may have a depth (e.g., thickness) of from about 50 microns (μm) to about 10 mm (such as from about 100 μm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable or ion exchanged, such that the glass composition can undergo ion-exchange or has undergone ion-exchange for glass strengthening before or after laser processing the transparent workpiece. For example, the transparent workpiece may comprise ion exchanged or ion exchangeable glass, such as Corning Gorilla® Glass available from Corning Incorporated of Corning, NY (e.g., code 2318, code 2319, and code 2320). Further, these ion exchangeable or ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, NY. Moreover, the transparent workpiece may comprise other components which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Tl^+$, $Cu^+$, or the like.

As used herein, the term "quasi-non-diffracting beam" is used to describe a laser beam having low beam divergence as mathematically described below. In particular, the laser beam is used to form a contour of defects in the embodiments described herein. The laser beam has an intensity distribution $I(X,Y,Z)$, where $Z$ is the beam propagation direction of the laser beam, and $X$ and $Y$ are directions orthogonal to the beam propagation direction, as depicted in the figures. The X-direction and Y-direction may also be referred to as cross-sectional directions and the X-Y plane may be referred to as a cross-sectional plane. The coordinates and directions $X$, $Y$, and $Z$ are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or through a phase altering optical element, such as an adaptive phase altering optical element (e.g., a spatial light modulator, an adaptive phase plate, a deformable mirror, or the like), a static phase altering optical element (e.g., a diffractive optical element, a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Referring to FIGS. 1A and 1B, each beam 122, 124, 126 of a laser beam combination 120 used to form the defects has an intensity distribution $I(X,Y,Z)$, where $Z$ is the beam propagation direction of a particular beam 122, 124, 126, and $X$ and $Y$ are directions orthogonal to the direction of propagation, as depicted in the figures. Indeed, the beam propagation direction of the first beam 122 is $Z_1$, the beam propagation direction of the second beam 124 is $Z_2$, and the beam propagation direction of the third beam 126 is $Z_3$. Planes orthogonal to the respective beam propagation directions $Z_1$, $Z_2$, $Z_3$ may be referred to as a cross-sectional plane and the intensity distribution of each beam 122, 124, 126 in a cross-sectional plane may be referred to as a cross-sectional intensity distribution.

Each beam 122, 124, 126 at a beam spot 112A, 112B, 112C or other cross section may comprise a quasi-non-diffracting beam, for example, a beam having low beam divergence as mathematically defined below, by impinging the laser beam combination 120 onto a phase altering optical element 140, as described in more detail below with respect to the optical assembly 100 depicted in FIG. 3A and the optical assembly 100' of FIG. 3B. Beam divergence refers to the rate of enlargement of the beam cross section in the direction of beam propagation (i.e., the $Z_1$, $Z_2$, $Z_3$ directions). As used herein, the phrase "beam cross section" refers to the cross section of a beam (e.g., beams 122, 124, 126) along a plane perpendicular to the beam propagation direction $Z_1$, $Z_2$, $Z_3$ of the that respective beam.

The length of the laser beam focal line produced from a quasi-non-diffracting beam is determined by the Rayleigh range of the quasi-non-diffracting beam. Particularly, the quasi-non-diffracting beam defines a laser beam focal line (e.g., 125A, 125B, 125C) having a first end point and a second end point each defined by locations where the quasi-non-diffracting beam has propagated a distance from the beam waist equal to a Rayleigh range of the quasi-non-diffracting beam. The length of the laser beam focal line corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. Pat. No. 10,730,783 which is incorporated by reference in their entireties.

The Rayleigh range corresponds to the distance (relative to the position of the beam waist as defined in Section 3.12 of ISO 11146-1:2005(E)) over which the variance at the position of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form defect segments 172A, 172B, 172C because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (1), below:

$$Z_R > F_D \frac{\pi w_{0,eff}^2}{\lambda} \tag{1}$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. For a non-diffracting or quasi-non-diffracting beam the distance (Rayleigh range), $Z_R$ in Equation (1), over which the effective spot size doubles, is $F_D$ times the distance expected if a standard Gaussian beam profile were used. The dimensionless divergence factor $F_D$ provides a criterion for determining whether or not a laser beam is quasi-non-diffracting. As used herein, the first, second, and third beams 122, 124, 126 are considered quasi-non-diffracting if the characteristics of the laser beam satisfy Equation (1) with a value of $F_D \geq 10$. As the value of $F_D$ increases, the first, second, and third beams 122, 124, 126 approach a more nearly perfectly non-diffracting state.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

Figure 2B:
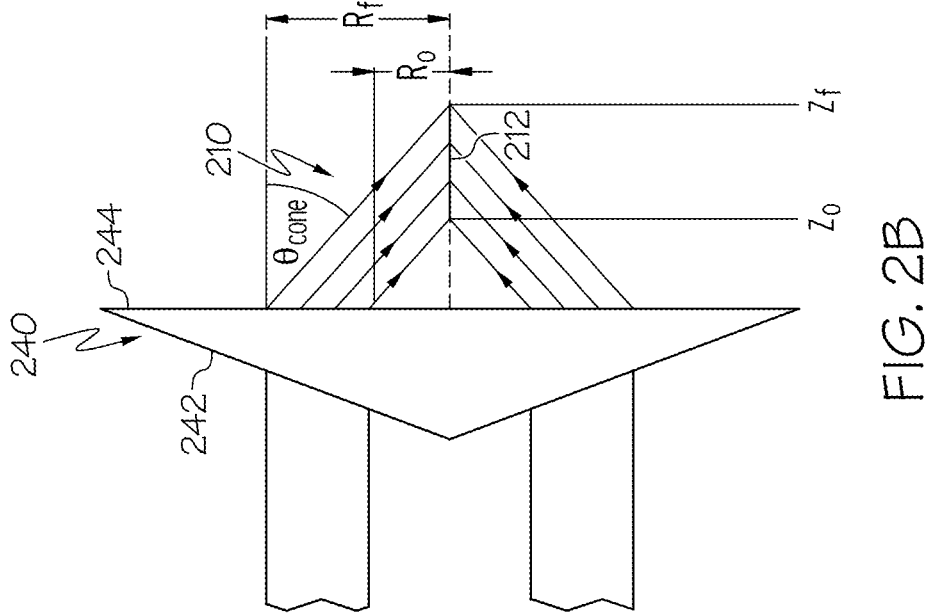
FIG. 2B schematically depicts another example laser beam downstream an axicon, according to one or more embodiments described herein.
Figure 2A:
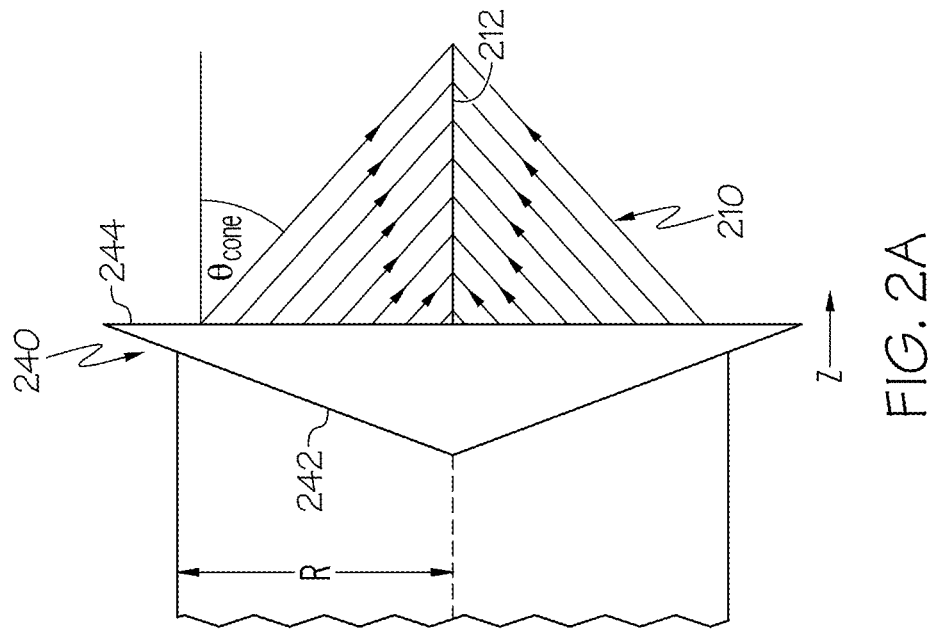
FIG. 2A schematically depicts an example laser beam downstream an axicon, according to one or more embodiments described herein.

Referring now to FIGS. 2A and 2B, a two-dimensional representation of the formation of a quasi-non diffracting beam (e.g., a Bessel beam) via an axicon 240 is depicted. FIGS. 2A and 2B are illustrative of the formation of the laser beam focal lines described herein. In FIGS. 2A and 2B, a Gaussian beam is incident on a first (upstream) side 242 of the axicon 240 and rays 210 are shown focusing into a laser beam focal line 212 on the second (downstream) side 244 of the axicon 240. Rays 210 leaving the axicon 240 at a radius, R, will intersect on the laser beam focal line 212 at a corresponding Z location, forming a cone of light comprising a cone-angle $\theta_{cone}$. FIG. 2A depicts the production of a full Bessel beam by filling the clear aperture of the axicon 240 with an initial (e.g., input) beam and FIG. 2B depicts the production of a shortened Bessel beam (e.g., the laser beam focal line 212) with active focal region in the range:

$$Z_0 < Z < Z_f \tag{2}$$

$$R_0 < R < R_f \tag{3}$$

where $Z_0 < Z < Z_f$ is made by restricting the initial beam to an annular slice with $R_0 < R < R_f$. Indeed, FIG. 2A shows how the laser beam focal line 212 depends on both the radial extent of the input beam and the cone-angle ($\theta_{cone}$) of the rays 210. The transformation from R to Z is approximately given by Equation 4:

$$Z = R/\tan \theta_{cone} \qquad (4)$$

and the length of the laser beam focal line 212 is shown by Equation (5):

$$Z_f - Z_0 = (R_f - R_0)/\tan \theta_{cone} \qquad (5)$$

Laser beam focal lines 212 having a length of a few mm can be made with relatively large input laser diameters (and therefore have a large $R_{max}$). However, the intensity of the laser beam focal line 212 is inversely proportional to its length. FIG. 2B shows how an annular slice of the incoming beam ($R_0 < R < R_f$) will focus into the laser beam focal line 212 over the focal region defined by $Z_0 < Z < Z_f$. The power of the laser beam focal line 212 over the distance from $Z_0$ to $Z_f$ produced by an annular slice of the input beam extending from $R_0$ to $R_f$ is equal to the integrated power contained in the annular slice—simply the area of the slice multiplied by the integrated beam intensity in that region. Since the area of an annular slice is directly proportional to the difference of squares of $R_0$ and $R_f$, slices originating close to the center of the axicon will contain less power than those originating from larger radii.

Referring again to FIGS. 1A and 1B, an example transparent workpiece 160 is schematically depicted undergoing laser processing according to the methods described herein. In particular, FIGS. 1A and 1B schematically depict directing the laser beam combination 120 comprising the first beam 122, the second beam 124, and the third beam 126 simultaneously into the transparent workpiece 160. While the laser beam combination 120 described herein includes three beams, it should be understood that the methods described herein are applicable to laser beam combinations comprising just two beams and laser beam combinations comprising more than three beams. As depicted in FIGS. 1A and 1B, the first beam 122, the second beam 124, and the third beam 126 are oriented along respective first, second, and third beam propagation axes 121A, 121B, and 121C. The first beam 122 is oriented along the first beam propagation axis 121A and directed into the transparent workpiece 160 at a first impingement location 111A with a first beam propagation angle $\theta_{bp1}$. The second beam 124 is oriented along the second beam propagation axis 121B and directed into the transparent workpiece 160 at a second impingement location 111B with a second beam propagation angle $\theta_{bp2}$. The third beam 126 is oriented along the third beam propagation axis 121C and directed into the transparent workpiece 160 at a third impingement location 111C and a third beam propagation angle $\theta_{bp3}$. The beam propagation angle $\theta_{bp}$ of each of the first, second, and third beams 122, 124, 126 comprises the average angle of light rays of the particular beam 122, 124, 126 impinging the impingement surface 162 relative to a plane orthogonal to the impingement surface 162 at each beam's respective impingement location (as shown in FIG. 1B).

The first impingement location 111A, the second impingement location 111B, and the third impingement location 111C are each laterally offset from one another along the impingement surface 162 of the transparent workpiece 160. For example, the second impingement location 111B is positioned between the first impingement location 111A and the third impingement location 111C. The first beam 122 forms a first beam spot 112A projected onto the impingement surface 162 at the first impingement location 111A.

The first beam 122 also forms a first laser beam focal line 125A in the transparent workpiece 160 and generates an induced absorption to produce a first defect segment 172A within the transparent workpiece 160. The second beam 124 forms a second beam spot 112B projected onto the impingement surface 162 at the second impingement location 111B. The second beam 124 also forms a second laser beam focal line 125B in the transparent workpiece 160 and generates an induced absorption to produce a second defect segment 172B within the transparent workpiece 160. The third beam 126 forms a third beam spot 112C projected onto the impingement surface 162 at the third impingement location 111C. The third beam 126 also forms a third laser beam focal line 125C in the transparent workpiece 160 and generates an induced absorption to produce a third defect segment 172C within the transparent workpiece 160. The first, second, and third impingement locations 111A, 111B, 111C are specific locations on the impingement surface 162 where the first, second, and third beams 122, 124, 126 respectively, are first incident upon and initially contact the impingement surface 162. When at least one of the laser beam combination 120 (including the first, second, and third beams 122, 124, 126 and first, second and third laser beam focal lines 125A, 125B, 125C) and the transparent workpiece 160 are translated relative to one another, the impingement locations 111A, 111B, 111C change.

A phase alteration is applied to each of the first, second, and third beams 122, 124, 126 such that the first, second, and third laser beam focal lines 125A, 125B, 125C each comprise a circular angular spectrum within the transparent workpiece 160 and exhibit a quasi-non-diffracting character (as mathematically defined above in Eq. (1)) within the transparent workpiece 160. In the embodiments depicted in FIGS. 1A and 1B, the first laser beam focal line 125A comprises a chamfer angle $\theta_{CH1}$ of greater than 5° relative to a plane 106A orthogonal to the impingement surface 162 at the first impingement location 111A (in either a clockwise or counterclockwise rotational direction with respect to the plane 106A), the second laser beam focal line 125B comprises a chamfer angle $\theta_{CH2}$ of less than 1° (such as 0°) relative to a plane 106B orthogonal to the impingement surface 162 at the second impingement location 111B (in either a clockwise or counterclockwise rotational direction with respect to the plane 106B), and the third laser beam focal line 125C comprises a chamfer angle $\theta_{CH3}$ of greater than 5° relative to a plane 106C orthogonal to the second surface 164 at the exit location 118 (in a rotational direction opposite the rotational direction of the chamfer angle $\theta_{CH3}$). The chamfer angle $\theta_{CH1}$ and the chamfer angle $\theta_{CH3}$ may be from 5° to 40°, such as 8° to 35°, 10° to 40°, 20° to 40°, or the like, for example, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, or any range having any two of these values as endpoints.

It should be understood that the above chamfer angles are example chamfer angles of the laser beam focal lines 125A, 125B, 125C and that other chamfer angles are contemplated. Indeed, as another example, the second laser beam focal line 125B may comprise a chamfer angle $\theta_{CH2}$ greater than 5° relative to the plane 106B orthogonal to the impingement surface 162 at the second impingement location 111B. Moreover, because the first, second, and third laser beam focal lines 125A, 125B, 125C comprise chamfer angles $\theta_{CH1}$, $\theta_{CH2}$, $\theta_{CH3}$, respectively, the resultant defect segments 172A, 172B, 172C formed by induced absorption comprise defect angles $\theta_{d1}$, $\theta_{d1}$, $\theta_{d1}$, that are equal to or about equal to the respective chamfer angles $\theta_{CH1}$, $\theta_{CH2}$, $\theta_{CH3}$. Thus, some or all of the defect segments 172A, 172B, 172C may be angled, where "angled" refers to an angular deviation from the direction normal to the impingement surface 162 at the respective impingement locations 111A, 111B, 111C or second surface 164 at exit location 118.

Moreover, each laser beam focal line 125A, 125B, 125C may further include a plurality of rays. Each individual ray of each laser beam focal line 125A, 125B, 125C may have the same phase, $\phi$, when converging to form a circular angular spectrum within the transparent workpiece 160. Each laser beam focal line 125A, 125B, 125C may have a length in a range of from 0.01 mm to 100 mm or in a range of from 0.1 mm to 10 mm. Various embodiments may be configured to have laser beam focal lines 125A, 125B, 125C with a length 1 of 0.01 mm, 0.05 mm, 0.1 mm, 0.2 mm, 0.5 mm, 0.7 mm, 1 mm, 2 mm, 3 mm, 4 mm, or 5 mm e.g., from 0.1 mm to 5 mm. Moreover, the rays of the laser beam focal lines 125A, 125B, 125C comprise an intensity that may be great enough to damage the glass of the transparent workpiece 160. Without intending to be limited by theory, an intensity great enough to damage the glass may correspond to the burst number, the type of glass, the focal spot size, and the pulse width, among other variables. As an example, and not by way of limitation, the damage threshold for glass may be from 1 to 2 terawatts per square centimeter (TW/cm$^2$). In embodiments, each laser beam focal line 125A, 125B, 125C may have an intensity of greater than 4 TW/cm$^2$, 5 TW/cm$^2$, or 6 TW/cm$^2$. In embodiments, the intensity may be greater than the damage threshold and only cause Type 1 damage. Type 1 damage changes the refractive index of the glass without cracking the glass.

Without intending to be limited by theory, the rays of the first, second, and third beams 122, 124, 126 refract upon entry into the transparent workpiece 160. Due to this refraction, the first and third beam propagation angles $\theta_{bp1}$, $\theta_{bp3}$ are greater, in absolute terms (i.e., more positive or more negative), than the first and the third chamfer angles $\theta_{CH1}$, $\theta_{CH3}$, respectively. Moreover, when the second beam 124 impinges the impingement surface 162 orthogonal the impingement surface 162, the second beam propagation angle $\theta_{bp2}$ is substantially equal to the second chamfer angle $\theta_{CH2}$. It should be understood that refraction of individual rays of the second beam 124 does occur upon entry into the transparent workpiece 160 at normal incidence but, due to the orthogonal geometry, this refraction does not alter the second chamfer angle $\theta_{CH2}$ with respect to the second beam propagation angle $\theta_{bp2}$.

In operation, the laser processing depicted in FIGS. 1A and 1B further includes translating at least one of the laser beam combination 120 (i.e., the laser beam focal lines 125A, 125B, 125C) and the transparent workpiece 160 relative to each other in a translation direction 101 along a contour line 165 (i.e., a line of desired separation) to form a plurality of defects 172 comprising defect segments 172A, 172B, 172C. The plurality of defects 172 form a contour 170 which may be used to separate the transparent workpiece 160 into a plurality of separated articles 260' (FIG. 12B). The defects 172 may extend, for example, partially or completely through the depth (i.e., the thickness) of the transparent workpiece 160. Furthermore, each of the defects 172 may comprise a C-chamfer shape in which the first and third defect segments 172A, 172C are angled at mirrored angles with respect to a plane orthogonal to the impingement surface 162 of the transparent workpiece 160 and the second defect segment 172B is orthogonal the impingement surface 162 of the transparent workpiece 160.

Referring now to FIG. 1B, the first laser beam focal line 125A and the first defect segment 172A extend between the impingement surface 162 and a first termination depth 115 within the transparent workpiece 160 and each terminate at a first termination location 114 which is positioned at the first termination depth 115. In some embodiments, the first laser beam focal line 125A and the first defect segment 172A extend from the impingement surface 162 to the first termination depth 115. However, in other embodiments, the first laser beam focal line 125A and the first defect segment 172A may begin within the transparent workpiece below the impingement surface 162 and termination at the first termination depth 115. As used throughout this disclosure, the term "termination point" refers to the termination point of the region of induced absorption for at least a portion of a laser beam focal line. The "termination point" as defined herein, may ultimately be the termination point for at least a portion of a defect segment within the transparent workpiece 160.

The second laser beam focal line 125B and the second defect segment 172B extend from the first termination location 114 to a second termination location 116, which is positioned at a second termination depth 117 within the transparent workpiece 160. As shown in FIG. 1B, the first termination depth 115 is closer to the impingement surface 162 than the second termination depth 117. Furthermore, the third laser beam focal line 125C and the third defect segment 172C extend from the second termination location 116 toward a second surface 164 of the transparent workpiece 160, which is opposite the impingement surface 162. In some embodiments, the third laser beam focal line 125C and the third defect segment 172C terminate within the transparent workpiece 160 between the second termination location 116 and the second surface 164. In other embodiments, the third laser beam focal line 125C and the third defect segment 172C reaches the second surface at an exit location 118. Moreover, in some embodiments, the exit location 118 is positioned along the plane 106A orthogonal to the impingement surface 162 at the first impingement location 111A. For example, in embodiments in which the first and third chamfer angles $\theta_{CH1}$, $\theta_{CH3}$ are mirrored, the second chamfer angle $\theta_{CH2}$ is 0° and the distance from the impingement surface 162 and the first termination depth 115 is equal to the distance from the second surface 164 and the second termination depth 117. This forms a C-chamfered edge when separated, as shown in FIGS. 12A and 12B by separated article 260', which comprises a C-chamfered edge 268.

Referring now to FIGS. 3A and 3B, an optical assembly 100, 100' for producing and phase altering the laser beam combination 120 is schematically depicted. Each optical assembly 100, 100' comprises a beam source 10, such as a Gaussian beam source, that outputs an initial beam 12, which may comprise a Gaussian beam. The beam source 10 may comprise any known or yet to be developed beam source 10 configured to output laser beams, for example, pulsed laser beams or continuous wave laser beams. In some embodiments, the beam source 10 may output an initial beam 12 comprising a wavelength of, for example, 1064 nm, 1030 nm, 532 nm, 515 nm, 355 nm, 343 nm, or 266 nm, or 257 nm. The initial beam 12 used to form defects 172 in the transparent workpiece 160 may be well suited for materials that are transparent to the selected laser wavelength and the transparent workpiece 160 may be positioned such that initial beam 12 output by the beam source 10 is phase altered by one or more phase altering optical elements 140 and thereafter irradiates the transparent workpiece 160 as the laser beam combination 120, for example, after impinging the one or more phase altering optical elements 140 and thereafter, the lens assembly 130. Further, a beam pathway 110 may extend from the beam source 10 to the transparent workpiece 160 such that when the beam source 10 outputs the initial beam 12, the initial beam 12 and (after phase alteration) the laser beam combination 120 traverses (or propagates along) the beam pathway 110.

Referring still to FIGS. 3A and 3B, the optical assembly 100, 100' each comprise the one or more phase altering optical elements 140, which may be adaptive phase altering optical elements 141, as shown in FIG. 3A, or static phase altering optical elements 142, as shown in FIG. 3B. In operation, the one or more phase altering optical elements 140 first phase alter the initial beam 12 to split the initial beam 12 into the laser beam combination 120 comprising the first, second, and third beams 122, 124, 126 and thereafter phase alter the laser beam combination 120 with at least a quasi-non-diffracting phase, which is a phase that renders each beam 122, 124, 126 of the laser beam combination 120 quasi-non-diffracting to each of the first, second, and third beams 122, 124, 126, such that the first, second, and third beams 122, 124, 126 form first, second, and third laser beam focal lines 125A, 125B, 125C in the transparent workpiece 160. Moreover, while a single initial beam 12 is depicted in FIGS. 3A and 3B, it should be understood that additional input beams may be used to form the laser beam combination 120. For example, three initial beams may be output by the beam source 10 or from multiple beam sources, such as a first beam source, a second beam source, and a third beam source. In such embodiments, the phase altering optical elements 140 do not need to first split the initial beam 12 into the laser beam combination 120 comprising the first, second, and third beams 122, 124, 126 before phase altering the laser beam combination 120 with at least a quasi-non-diffracting phase.

Figure 5:
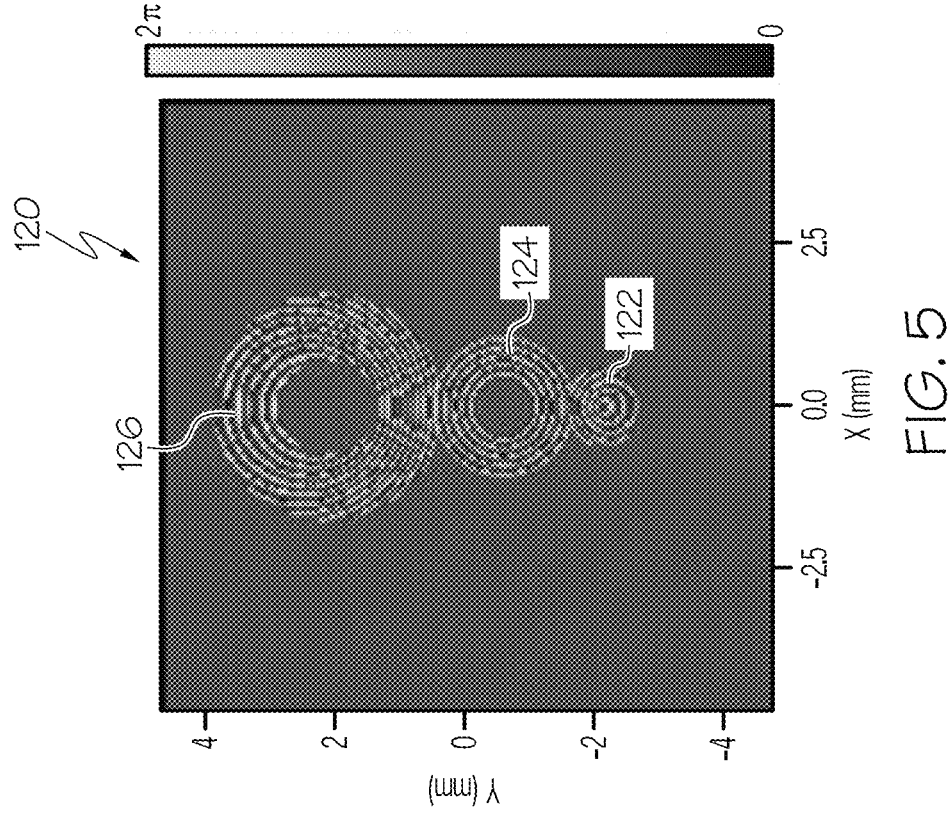
FIG. 5 schematically depicts a phase profile of the laser beam combination of FIG. 4, according to one or more embodiments shown and described herein.
Figure 4:
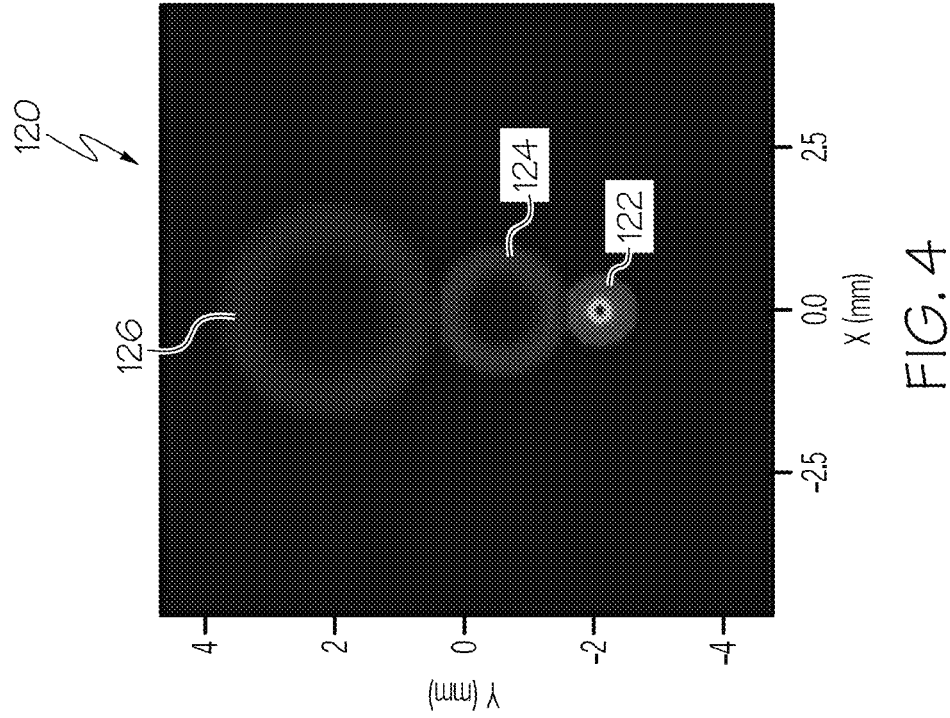
FIG. 4 schematically depicts an intensity profile of a laser beam combination comprising a first beam, a second beam, and a third beam, propagating downstream from the adaptive phase altering optical element of FIG. 3A, according to one or more embodiments shown and described herein.

In FIG. 4, an intensity distribution of the first, second, and third beams 122, 124, 126 used to form the first, second, and third laser beam focal lines 125A, 125B, 125C in the transparent workpiece 160 is shown. Similarly, in FIG. 5, a phase profile of the first, second, and third beams 122, 124, 126 used to form the first, second, and third laser beam focal lines 125A, 125B, 125C in the transparent workpiece 160 is shown. While FIGS. 4 and 5 depicts displacement of the first, second, and third beams 122, 124, 126 and the respective phase profiles in the Y-direction, it should be understood that this displacement may be done in the X-direction or in a combination of the X-direction and the Y-direction.

Referring again to FIGS. 3A and 3B, the one or more phase altering optical elements 140 are positioned within a beam pathway 110 between the beam source 10 and the transparent workpiece 160, in particular, between the beam source 10 and the lens assembly 130 such that the laser beam combination 120 impinges the one or more phase altering optical elements 140 before the laser beam combination 120 is focused into respective laser beam focal lines 125A, 125B, 125C and directed into the transparent workpiece 160. In some embodiments, as shown in FIG. 3A, the beam source 10 is positioned such that the beam pathway 110 is redirected by a phase altering optical element 140 and the initial beam 12 reflects off the phase altering optical element 140 when the initial beam 12 first impinges the phase altering optical element 140. In this embodiment, the phase altering optical element 140 may comprise an adaptive phase altering optical element 141, such as a spatial light modulator, a deformable mirror, an adaptive phase plate, or any other optical element configured to actively or passively alter a change in phase applied by the optical element to the initial beam 12 and the laser beam combination 120.

Indeed, as shown in FIG. 3A, the optical assembly comprises a first mirror 136 and a second mirror 138. The first mirror 136 is positioned to receive the laser beam combination 120 from a first section 143 of the adaptive phase altering optical element 141, where the first section 143 comprises a beam splitting phase mask configured to split the initial beam 12 into the laser beam combination 120. The initial beam 12 can be split either directly in the spatial domain e. g. with the input beam 12 being divided into three sections and the laser intensity from each being directed into a different portion of a second section 145 of the adaptive phase altering optical element 141 or via Fourier-transform-based numerical phase-shaping methods, such as the Gerchberg-Saxton algorithm, where a lens is placed between the first section 143 and the second section 145 so that the second section 145 is in the Fourier plane of the first section 143. The first mirror 136 directs the laser beam combination 120 toward the second mirror 138, which redirects the laser beam combination 120 toward a second section 145 of the adaptive phase altering optical element 141. The second section 145 is laterally offset from the first section 143 along a surface 147 of the adaptive phase altering optical element 141. The second section 145 comprises a first quasi-non-diffracting phase mask, a second quasi-non-diffracting phase mask, and a third quasi-non-diffracting phase mask, each laterally offset from one another where the second quasi-non-diffracting phase mask is positioned between the first quasi-non-diffracting phase mask and the third quasi-non-diffracting phase mask. In some embodiments, these quasi-non-diffracting phase masks will consist of annular regions to facilitate the control over beam length shown in FIG. 2B. In other embodiments, the quasi-non-diffracting phase masks may comprise full circular regions, but the laser intensity incident on the region will have an annular shape. The second mirror 138 is positioned to direct the first beam 122 of the laser beam combination 120 onto the first quasi-non-diffracting phase mask of the second section 145 of the adaptive phase altering optical element 141, direct the second beam 124 of the laser beam combination 120 onto the second quasi-non-diffracting phase mask of the second section 145 of the adaptive phase altering optical element 141, and direct the third beam 126 on the third quasi-non-diffracting phase mask of the second section 145 of the adaptive phase altering optical element 141.

Referring still to FIG. 3A, the first quasi-non-diffracting phase mask is configured to apply a corrective phase to counteract the phase imparted by the beam splitting phase mask, an aberration-corrected quasi-non-diffracting phase, and a prism phase to the first beam 122 of the laser beam combination 120, upon impingement of the first beam 122 onto the first quasi-non-diffracting phase mask. The second quasi-non-diffracting phase mask is configured to apply a corrective phase to counteract the phase imparted by the beam splitting phase mask and a quasi-non-diffracting phase to the second beam 124 of the laser beam combination 120, upon impingement of the second beam 124 onto the second quasi-non-diffracting phase mask. The third quasi-non-diffracting phase mask is configured to apply a corrective phase to counteract the phase imparted by the beam splitting phase mask, an aberration-corrected quasi-non-diffracting phase, and a prism phase to the third beam 126 of the laser beam combination 120, upon impingement of the third beam 126 onto the third quasi-non-diffracting phase mask. The corrective phase applied at each quasi-non-diffracting mask to counteract the phase imparted by the beam splitting mask is roughly equal to the opposite of the phase that the beam has when impinging on that quasi-non-diffracting mask so that the phase of the beam at the impingement location and after application of the corrective phase is roughly equal to a plane wave. The corrective phase may be equal to 0 in the case that the beam has a phase similar to a plane wave when originally impinging on the quasi-non-diffracting mask. Moreover, it should be understood that the first, second, and third beams 122, 124, 126 of the laser beam combination 120 may simultaneously impinge the first, second, and third quasi-non-diffracting phase masks, respectively. The phase alteration applied by each of the first, second, and third quasi-non-diffracting phase masks is described in more detail below with respect to FIGS. 6A-6G. Indeed, the first quasi-non-diffracting phase mask may comprise the phase mask 150A of FIG. 6B, the second quasi-non-diffracting phase mask may comprise the phase mask 154 of FIG. 6D, and the third quasi-non-diffracting phase mask may comprise the phase mask 150B of FIG. 6F. Furthermore, while the second section 145 of the adaptive phase altering optical element 141 is described herein as comprising three quasi-non-diffracting phase masks, it should be understood that embodiments with just two quasi-non-diffracting phase masks and embodiments with greater than three quasi-non-diffracting phase masks are contemplated. Indeed, it should be understood that the number of quasi-non-diffracting phase masks may be chosen to align with the number of beams in the laser beam combination 120 or may be chosen to be greater than the number of beams in the laser beam combination 120.

Figure 3C:
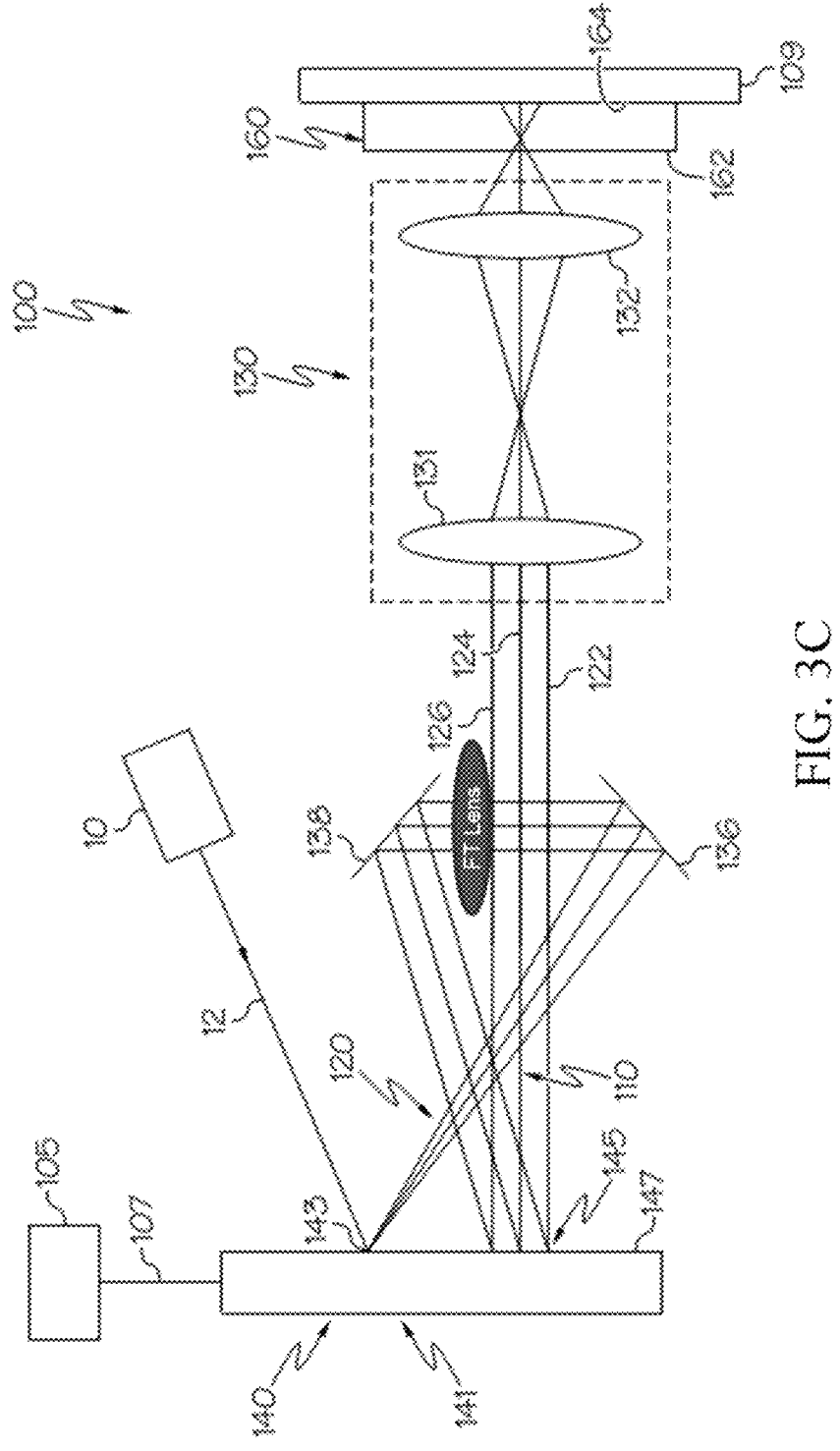
FIG. 3C schematically depicts a variation of the optical assembly shown in FIG. 3A that includes a Fourier transform lens, according to one or more embodiments described herein.
Figure 3D:
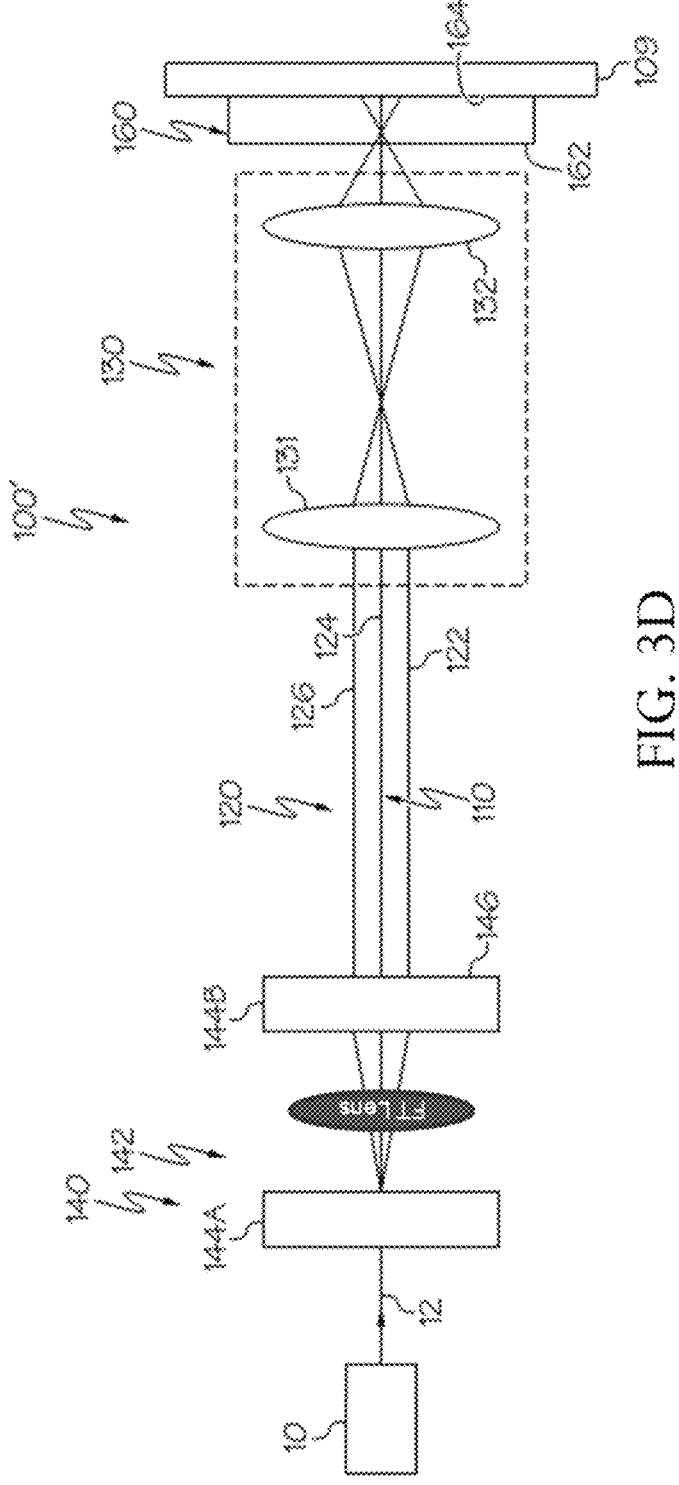
FIG. 3D schematically depicts a variation of the optical assembly shown in FIG. 3B that includes a Fourier transform lens, according to one or more embodiments described herein.

In other embodiments, the optical systems 100, 100' shown in FIGS. 3A and 3B include a Fourier transform lens to facilitate determination of the phase mask at first section 143 based on a target phase mask at second section 145 using a numerical algorithm such as the Gerchberg-Saxton algorithm. FIGS. 3C and 3D show placement of a Fourier transform lens (labeled "FT Lens") between first section 143 and second section 145 of the adaptive phase altering optical element 141 in variations of the optical systems 100, 100' shown in FIGS. 3A and 3B, respectively. In one embodiment, the Fourier transform lens is placed at the midpoint of the optical path extending from first section 143 to second section 145. In another embodiment, the distance along the optical path from each of first section 143 and second section 145 to the Fourier transform lens is equal to the focal length of the Fourier transform lens. In a further embodiment, the Gerchberg-Saxton algorithm is used to determine a phase mask at first section 143 that produces or controls the amplitude of the beam at second section 145. In one embodiment, the Fourier transform lens is placed at the midpoint of the optical path extending from first section 143 to second section 145, where the distance between the midpoint and section 143 or 145 is equal to the focal length of the lens. In a further embodiment, the Gerchberg-Saxton algorithm is used to determine a phase mask at first section 143 that produces or controls the amplitude of the beam at second section 145.

The adaptive phase altering optical element 141 may be communicatively coupled to a controller 105, for example, using one or more communications pathways 107, which may comprise any pathway for providing power signals, control signals, or the like, such as optical fiber, electrical wire, wireless protocols, or the like. In operation, the controller 105 may provide control signals to the adaptive phase altering optical element 141 to control the specific phase alteration (e.g., modulation, phase mask, or the like) applied by sections (e.g., the first and second sections 143, 145) of the adaptive phase altering optical element 141, such that the adaptive phase altering optical element 141 applies specific phase alterations to the initial beam 12 and the laser beam combination 120, for example, based on a phase function.

In some embodiments, the adaptive phase altering optical element 141 comprises a spatial light modulator, which is a transmissive or reflective device that may spatially modulate the amplitude and/or the phase of the initial beam 12 and/or the laser beam combination 120 in at least one dimension, for example, using a phase mask, such as the phase masks of FIGS. 6B, 6E, and 6G. In operation, the spatial light modulator may apply a selective, configurable phase alteration to the initial beam 12 and/or the laser beam combination 120 based on control signals from the controller 105. In some embodiments, the adaptive phase altering optical element 141 comprises a deformable mirror, which is a mirror whose surface can be deformed in response to control signals, such as control signals from the controller 105, to alter the wavefront of the initial beam 12 and thereafter, the laser beam combination 120, which may alter the phase of the initial beam 12 and thereafter, the laser beam combination 120. For example, a deformable mirror may be configured to apply a phase mask, such as the phase masks of FIGS. 6B, 6E, and 6G. Further, in some embodiments, the adaptive phase altering optical element 141 comprises an adaptive phase plate, which is a phase plate (or phase plate assembly) that can apply selective and controllable phase alteration to the initial beam 12 and the laser beam combination 120 in response to control signals, such as control signals from the controller 105. For example, the adaptive phase plate may be two or more phase plates moveable relative to one another (based on control signals from the controller 105) to alter the phase change they apply to the initial beam 12 and/or the laser beam combination 120 based on their relative positioning.

FIG. 6A depicts a first oblong angular spectrum 180A, which may be formed by applying an aberration-corrected quasi-non-diffracting phase and a prism phase to the first beam 122 of the laser beam combination 120 using the adaptive phase altering optical element 141 to ensure that the first laser beam focal line 125A exhibits essentially aberration-free character at a particular chamfer angle $\theta_{CH1}$ greater than or equal to 5° and a particular spacing between the focal plane of lens 132 and impingement surface 162. The first oblong angular spectrum 180A is designed to correct for aberrations that occur when an angled beam (a beam incident to impingement surface 162 at a non-normal angle) refracts at impingement surface 162. In particular, the embodiment shown in FIG. 6A depicts the first oblong angular spectrum 180A comprising an axis of symmetry 182 extending from a first axis end 184 having a first radius of curvature to a second axis end 186 having a second radius of curvature. Further, the first radius of curvature (i.e., the radius of curvature at the first axis end 184) is different than the second radius of curvature (i.e., the radius of curvature at the second axis end 186). In other words, the shape of the first oblong angular spectrum 180A is roughly the combination of two different ellipses (or ovals) differing in curvature, and is colloquially referred to herein as an "egg shape." In addition, the first oblong angular spectrum 180A includes a major axis 188 (sometimes referred to as a "long axis") and a minor axis 189 (sometimes referred to as a "short axis"), where the major axis 188 is coincident with the axis of symmetry 182. The minor axis 189 and the major axis 188 intersect at an intersection point 185. Furthermore, the intersection point 185 is laterally offset from a center-point 135 of a final focusing optic (e.g., the second lens 132 in the optical assembly 100 of FIGS. 3A and 3B). The lateral offset is lateral with respect to the direction normal to the impingement surface 162 of the transparent workpiece 160. This lateral offset is due to the addition of a prism phase to the beam. The prism phase causes the first beam 122 (or the third beam 126) to be angled as shown in FIG. 1B, and in this case is applied to the first and third quasi-non-diffracting phase masks which generate the angled defect segments 172A and 172C. The magnitude of the offset distance A is proportional to the angle of the beams and therefore the chamfer angle $\theta_{CH1}$ (or chamfer angle $\theta_{CH3}$) as well. It is noted that the offset distance for the first beam 122 and third beam 126 may be the same or different.

FIG. 6B depicts a phase mask 150A that may be used by the adaptive phase altering optical element 141 to phase alter the first beam 122 with an aberration-corrected quasi-non-diffracting phase and a prism phase to produce the first oblong angular spectrum 180A shown in FIG. 6A. An annular section of the phase mask 150A may comprise the first quasi-non-diffracting phase mask of the second section 145 of the adaptive phase altering optical element 141. Alternatively, the full phase mask depicted in FIG. 6B may be applied to a portion of the second section 145 of the adaptive phase altering optical element 141. In some embodiments, an annular section of the full phase mask depicted in FIG. 6B may be illuminated as a result of the beam splitting mask in the first section 143 of the adaptive phase altering optical element 141. Three separate annular illumination regions 126, 124, and 122 are depicted in FIG. 4.

As shown in FIG. 6B, the phase mask 150A comprises a superposition 152 of a plurality of phase rings 158 and a prism phase 159 each inducing a phase shift extending from 0 to $2\pi$, where the phase mask has an x-axis of about 400 pixels and a y-axis of about 300 pixels. FIG. 6C depicts a partial mask 158A with a plurality of phase rings and a partial mask 159A with a prism phase that may be superimposed to form phase mask 150A shown in FIG. 6B. In the portion of the partial phase mask 158A where x is greater than about 60 pixels and x is less than about 350 pixels, each of the phase rings comprises a circular shape similar to a circular angular spectrum. In the portion of the partial phase mask 158A where x is less than about 60 pixels and x is greater than about 350 pixels, each of the phase rings comprises an oblong shape similar to the first oblong angular spectrum 180A shown in FIG. 6A. Indeed, each phase ring in the portion of the partial phase mask 158A where x is less than about 60 pixels and x is greater than about 350 pixels comprises an axis of symmetry extending from a first axis end having a first radius of curvature to a second axis end having a second radius of curvature, where the first radius of curvature is different than the second radius of curvature. However, unlike the first oblong angular spectrum 180A, the minor axis of each phase ring in the portion of the partial phase mask 158A where x is less than about 60 pixels and x is greater than about 350 pixels is coincident with the axis of symmetry of each phase ring, instead of the major axis.

Without intending to be limited by theory, the first oblong angular spectrum 180A depicted in FIG. 6A is indicative of the particular phase alteration applied to the first beam 122 to facilitate the formation of the first laser beam focal line 125A that exhibits quasi-non-diffracting character within the transparent workpiece 160 after the first beam 122 is directed at a high beam propagation angle $\theta_{b1}$ onto an impingement surface 162, which is planar, and refracts such that the first laser beam focal line 125A comprises the first chamfer angle $\theta_{CH1}$ within the transparent workpiece 160. In particular, the aberration corrected quasi-non-diffracting phase alteration forms the oblong shape of the first oblong angular spectrum 180A and prism phase alteration forms the lateral offset between the intersection point 185 and the centerpoint 135 of the final focusing optic. The first oblong angular spectrum 180A is shaped such that, when the first beam 122 (e.g., the first laser beam focal line 125A) is refracted at the impingement surface 162 (e.g., at the air-glass interface formed at the impingement surface 162), the first beam 122 within the transparent workpiece 160 (e.g., the first laser beam focal line 125A) comprises a circular or approximately circular angular spectrum. That is, refraction of the first beam 122 having the first oblong angular spectrum 180A at the impingement surface 162 transforms the angular spectrum of the first beam 122 to a less oblong, more circular shape within the transparent workpiece 160. For example, in some embodiments, the first beam 122 within the transparent workpiece 160 (e.g., the first laser beam focal line 125A) may have an angular spectrum that has a first radius of curvature and a second radius of curvature, similar to the first oblong angular spectrum 180A; however the angular spectrum of the first beam 122 within the transparent workpiece 160 is more circular (e.g., less oblong) than the first oblong angular spectrum 180A such that a difference between the first radius of curvature and the second radius of curvature of the angular spectrum of the first beam 122 within the transparent workpiece 160 is less than a difference between the first radius of curvature and the second radius of curvature of the first oblong angular spectrum 180A of the first beam 122 incident to the impingement surface 162 of the transparent workpiece 160.

FIG. 6D depicts a circular angular spectrum 190, which may formed by applying an quasi-non-diffracting phase to the second beam 124 of the laser beam combination using the adaptive phase altering optical element 141 to ensure that the second laser beam focal line 125B exhibits essentially aberration-free character at a particular chamfer angle $\theta_{CH2}$ less than 1° and a particular spacing between the focal plane of lens 132 and impingement surface 162. The circular angular spectrum 190 comprises a centerpoint 192 that is laterally aligned with centerpoint 135 of the final focusing optic. FIG. 6E depicts a phase mask 154 that may be used by the phase altering optical element 140 to phase alter the second beam 124 to produce circular angular spectrum 190 shown in FIG. 6D. As shown in FIG. 6E, the phase mask 154 comprises a plurality of phase rings 156 each inducing a phase shift extending from 0 to $2\pi$, where the phase mask 154 has an x-axis of about 400 pixels and a y-axis of about 300 pixels. The phase mask 154 may comprise the second quasi-non-diffracting phase mask of the second section 145 of the adaptive phase altering optical element 141. Without intending to be limited by theory, the circular angular spectrum 190 depicted in FIG. 6D is indicative of the particular phase alteration applied to the second beam 124 to facilitate the formation of the second laser beam focal line 125B that exhibits quasi-non-diffracting character within the transparent workpiece 160 after the second beam 124 is directed into the impingement surface 162, which is planar. The circular angular spectrum 190 is shaped such that, when the second beam 124 (e.g., the second laser beam focal line 125B) is refracted at the impingement surface 162 (e.g., at the air-glass interface formed at the impingement surface 162), the second beam 124 within the transparent workpiece 160 (e.g., the second laser beam focal line 125B) comprises a circular or approximately circular angular spectrum.

FIG. 6F depicts a second oblong angular spectrum 180B, which may be formed by applying an aberration-corrected quasi-non-diffracting phase and a prism phase to the third beam 126 of the laser beam combination 120 using the adaptive phase altering optical element 141 to ensure that the third laser beam focal line 125C exhibits essentially aberration-free character at a particular chamfer angle $\theta_{CH3}$ greater than or equal to 5° and a particular spacing between the focal plane of lens 132 and impingement surface 162. Similar to the first oblong angular spectrum 180A, the second oblong angular spectrum 180B is designed to correct for aberrations that occur when an angled beam (a beam incident to impingement surface 162 at a non-normal angle) refracts at impingement surface 162. The second oblong angular spectrum 180B is a mirrored version of the first oblong angular spectrum 180A. Thus, the intersection point 185 of the minor axis 189 and the major axis 188 is laterally offset from the centerpoint 135 of the final focusing optic (by an offset distance B) in a direction opposite the direction of lateral offset between the intersection point 185 of the first oblong angular spectrum 180A, as shown in FIG. 6A. Furthermore, FIG. 6G depicts a phase mask 150B that may be used by the phase altering optical element 140 to phase alter the third beam 126 to produce the second oblong angular spectrum 180B shown in FIG. 6F. As shown in FIG. 6G, the phase mask 150B comprises a plurality of phase rings each inducing a phase shift extending from 0 to $2\pi$ (combined with a prism phase in a manner similar to phase mask 150A discussed above, where the phase mask 150B has an x-axis of about 400 pixels and a y-axis of about 300 pixels. The phase mask 150B may comprise the third quasi-non-diffracting phase mask of the second section 145 of the adaptive phase altering optical element 141.

Without intending to be limited by theory, the second oblong angular spectrum 180B depicted in FIG. 6F is indicative of the particular phase alteration applied to the third beam 126 to facilitate the formation of the third laser beam focal line 125C that exhibits quasi-non-diffracting character within the transparent workpiece 160 after the third beam 126 is directed at a high beam propagation angle $\theta_{b3}$ onto an impingement surface 162, which is planar, and refracts such that the third laser beam focal line 125C comprises the third chamfer angle $\theta_{CH3}$ within the transparent workpiece 160. The second oblong angular spectrum 180B is shaped such that, when the third beam 126 (e.g., the third laser beam focal line 125C) is refracted at the impingement surface 162 (e.g., at the air-glass interface formed at the impingement surface 162), the third beam 126 within the transparent workpiece 160 (e.g., the third laser beam focal line 125C) comprises a circular or approximately circular angular spectrum. That is, refraction of the third beam 126 having the second oblong angular spectrum 180B at the impingement surface 162 transforms the angular spectrum of the third beam 126 to a less oblong, more circular shape within the transparent workpiece 160. For example, in some embodiments, the third beam 126 within the transparent workpiece 160 (e.g., the third laser beam focal line 125C) may have an angular spectrum that has a first radius of curvature and a second radius of curvature, similar to the second oblong angular spectrum 180C; however the angular spectrum of the third beam 126 within the transparent workpiece 160 is more circular (e.g., less oblong) than the second oblong angular spectrum 180B such that a difference between the first radius of curvature and the second radius of curvature of the angular spectrum of the third beam 126 within the transparent workpiece 160 is less than a difference between the first radius of curvature and the second radius of curvature of the second oblong angular spectrum 180B of the third beam 126 incident to the impingement surface 162 of the transparent workpiece 160.

Referring again to FIG. 3B, when the one or more phase altering optical elements 140 comprise two static phase altering optical elements 142, such as the first diffractive optical element 144A and the second diffractive optical element 144B, the beam source is 10 is positioned such that the beam pathway 110 extends through the first diffractive optical element 144A and the second diffractive optical element 144B. While the first diffractive optical element 144A and the second diffractive optical element 144B are shown as transmissive optical elements, it should be understood that the same diffractive characteristics of the first diffractive optical element 144A and the second diffractive optical element 144B may be applied to a reflective optical element. The first diffractive optical element 144A is positioned upstream the second diffractive optical element 144B. The first diffractive optical element 144A comprises a diffractive beam splitter configured to form the laser beam combination 120 from the initial beam 12. The beam can be split either directly in the spatial domain e. g. with the input Gaussian beam being divided into three sections and the laser intensity from each being directed into a different portion of the second diffractive optical element 144B or via Fourier transform where a lens is placed between the first diffractive optical element 144A and the second diffractive optical element 144B so that the second diffractive optical element 144B is in the Fourier plane of the first diffractive optical element 144A. The second diffractive optical element 144B is configured such that the respective laser beam focal lines 125A, 125B, 125C are simultaneously formed in the transparent workpiece 160. In particular, as depicted in FIG. 7A, the second diffractive optical element 144B comprises a first diffraction region 148A, a second diffraction region 148B, and a third diffraction region 148C. Each of the first, second, and third diffraction regions 148A, 148B, 148C are laterally offset along a surface 146 of the second diffractive optical element 144B. The second region 148B is positioned between the first diffraction region 148A and a third diffraction region 148C along the surface 146. The first diffraction region 148A and the third diffraction region 148C are each configured to apply an aberration corrected quasi-non-diffracting phase and a prism phase to the first beam 122 and the third beam 126, respectively, of the laser beam combination 120, and the second diffraction region 148B is configured to apply an quasi-non-diffracting phase to the second beam 124 of the laser beam combination 120. As noted above, application of a prism phase to first beam 122 and third beam 126 causes first beam 122 and third beam 126 to impinge upon impingement surface 162 at a non-normal beam propagation angle $\theta_{bp}$.

Referring now to FIG. 7A, each of the first, second, and third diffraction regions 148A, 148B, 148C are regions of variable thickness with respect to the surface 146. The first, second, and third diffraction regions 148A, 148B, 148C comprise periodic protrusions, depressions, or combinations thereof. The variable thickness of the periodic protrusions and/or periodic depressions of the first diffraction region 148A correspond with the phase variation of the phase mask 150A of FIG. 6B. Thus, the first diffraction region 148A applies an aberration corrected quasi-non-diffracting phase and a prism phase to the first beam 122 such that the first beam 122 comprises the first oblong angular spectrum 180A (FIG. 6A) downstream from the second diffractive optical element 144A. The variable thickness of the periodic protrusions and/or periodic depressions of the second diffraction region 148B correspond with the phase variation of the phase mask 154 of the FIG. 6E. Thus, the second diffraction region 148B applies a quasi-non-diffracting phase to the second beam 124 such that the second beam 124 comprises the circular angular spectrum 190 (FIG. 6D) downstream from the second diffractive optical element 144B. The variable thickness of the periodic protrusions and/or periodic depressions of the third annular diffraction region 148C correspond with the phase variation of the phase mask 150B of FIG. 6G. Thus, the third diffraction region 148C applies an aberration corrected quasi-non-diffracting phase and a prism phase to the third beam 126 such that the third beam 126 comprises the second oblong angular spectrum 180B (FIG. 6F) downstream from the second diffractive optical element 144B. In the embodiment depicted in FIG. 7A, the first diffraction region 148A, the second diffraction region 148B, and the third diffraction region 148C are annular. However, it should be understood that other diffraction regions are contemplated.

Referring now to FIG. 7B, a second diffractive element 144B' is depicted which may be used in place of the second diffractive element 144B of FIG. B. The second diffractive element 144B' comprises a first diffractive region 148A', a second diffractive region 148B', and a third diffractive region 148C'. These first, second, and third diffractive regions 148A', 148B', 148C' are filled (e.g., are non-annular) and may be circular or roughly circular, as depicted in FIG. 7B. In some embodiments, annular sections of the first, second, and third diffractive regions 148A', 148B', 148C' depicted in FIG. 7B may be illuminated by the annular illumination regions of beams 122, 124, 126 (as depicted in FIG. 4) as a result of an upstream beam splitting diffractive element.

Referring now to FIG. 8, the geometry of the laser beam combination 120 used to form a separated article 260' with a C-chamfered edge 268 (FIG. 12B) from a transparent workpiece 160 is schematically depicted. FIG. 8 illustrates the spaced-apart nature of the masks and diffractive regions of the phase altering optical element 140. That is, the spaced-apart nature of the phase masks of the adaptive phase altering optical element 141 and the spaced-apart nature of the diffractive regions of the static phase altering optical element 142. In FIG. 8, the lens assembly 130 is not shown, but would be placed between phase altering optical element 140 and transparent workpiece 160.

Without intending to be limited by theory, the depth location of each of the first, second, and third laser beam focal lines 125A, 125B, 125C within the transparent workpiece 160 is controlled by the inner diameters and the outer diameters of the first, second, and third beams 122, 124, 126, respectively, which approach the transparent workpiece 160 as annuli. Furthermore, the thickness of the annulus of each beam 122, 124, 126 (i.e., the difference between the outer diameter and the inner diameter) controls the length of the respective laser beam focal lines 125A, 125B, 125C formed from each beam 122, 124, 126. The phase altering optical element 140, in combination with the lens assembly 130, is used to control both the offset position of each beam 122, 124, 126, the length of each laser beam focal line 125A, 125B, 125C, and the depth location of each laser beam focal line 125A, 125B, 125C.

In the embodiment depicted in FIG. 8, the first beam 122, which focuses into the first laser beam focal line 125A, forms the top beam of the C-chamfer beam combination of laser beam focal lines 125A, 125B, 125C that form in the transparent workpiece 160. The first beam 122 propagates from a first location 402 of the phase altering optical element 140. The second beam 124, which focuses into the second laser beam focal line 125B, forms the middle beam of the C-chamfer beam combination of laser beam focal lines 125A, 125B, 125C that form in the transparent workpiece 160. The second beam 124 propagates from a second location 404 of the phase altering optical element 140. The third beam 126, which focuses into the third laser beam focal line 125C, forms the bottom beam of the C-chamfer beam combination of laser beam focal lines 125A, 125B, 125C that form in the transparent workpiece 160. The third beam 126 propagates from a third location 406 of the phase altering optical element 140.

In embodiments comprising the adaptive phase altering optical element 141 of FIG. 3A, the first location 402 is the location along the surface 147 of the first quasi-non-diffracting phase mask (e.g., phase mask 150A), the second location 404 is the location along the surface 147 of the second quasi-non-diffracting phase mask (e.g., phase mask 154), and the third location 406 is the location along the surface 147 of the third quasi-non-diffracting phase mask (e.g., phase mask 150B). In embodiments comprising the first and second diffractive optical elements 144A, 144B of FIG. 3B, the first location 402 is the location of the first diffractive region 148A on surface 146 of the second diffractive optical element 144B, the second location 404 is the location of the second diffractive region 148B on surface 146 of the second diffractive optical element 144B, and the third location 406 is the location of the third diffractive region 148C on surface 146 of the second diffractive optical element 144B.

Without intending to be limited by theory, the lateral offset between the first location 402 and the third location 406 depends on the desired starting depth of the first laser beam focal line 125A in the transparent workpiece 160 (i.e., the position of the first laser beam focal line 125A at or nearest the impingement surface 162 of the transparent workpiece 160), the desired ending depth of the third laser beam focal line 125C in the transparent workpiece 160 (i.e., the position of the third laser beam focal line 125C at or nearest the second surface 164 of the transparent workpiece 160), the desired first chamfer angle $\theta_{CH1}$, and the desired third chamfer angle $\theta_{CH3}$.

In the embodiment of FIG. 8, axis 400 extends from the phase altering optical element 140 at an origin location 401 between the first location 402 and the third location 406, laterally equidistant from the first location 402 and the third location 406. The origin location 401 is also laterally positioned between the second location 404 and the third location 406. Thus, the second location 404 is nearer the first location 402 than the third location 406. To form a defect that is a symmetric C-chamfer shape, the first beam 122 and the third beam 126 are laterally offset at the phase altering optical element 140 (i.e., the first location 402 and the third location 406 are laterally offset) such that the first beam propagation axis 121A intersects the third beam propagation axis 121C at intersection point 405 location in the center of the transparent workpiece 160. That is, the intersection point 405 is equidistant to the impingement surface 162 and the second surface 164.

For a chamfer where $\theta_{CH1} = \theta_{CH3}$, as depicted in FIG. 8, the lateral offset of the first location 402 and the third location 406 relative to the origin location 401 of the phase altering optical element 140 are shown approximately by Equations (6) and (7):

$$T_{off} = -(t_{sub}/2n + d_{off})(\tan \theta_{CH1}) \tag{6}$$

$$B_{off} = (t_{sub}/2_n + d_{off})(\tan \theta_{CH3}) \tag{7}$$

where $T_{off}$ is the offset of the first location 402 (i.e., the impingement location of the first beam 122 with surface 146/147) from the origin location 401, $B_{off}$ is the offset of the third the third location 406 (i.e., the impingement location of the third beam 126 with surface 146/147) from the origin location 401, $t_{sub}$ is the thickness of the transparent workpiece 160, n is the refractive index of the transparent workpiece 160, and $d_{off}$ is an offset distance due to the first beam 122 starting from a nonzero radius. Furthermore, the lateral offset of the second location 404 from the origin location 401 is shown by Equation (8):

$$M_{off}=(L_{mid}/2n)(\tan\theta_{CH1}) \tag{8}$$

In Equation (8), $M_{off}$ is the offset of the second location 404 (i.e., the impingement location of the second beam 124 with surface 146/147) from the origin location 401, $L_{mid}$ is the desired length of the second laser beam focal line 125B within the transparent workpiece 160 (that is, the middle segment of a C-chamfered focal line combination). To form a defect that is a symmetric C-chamfer shape, $L_{mid}$ may be $t_{sub}/3$, i.e., one third of the thickness of the transparent workpiece 160.

Referring still to FIG. 8, the depth location within the transparent workpiece 160 and the length of each laser beam focal lines 125A, 125B, 125C is dependent on the outer diameter of the annulus of each beam 122, 124, 126, the thickness of the annulus of each beam 122, 124, 126 (i.e., the difference between the outer diameter and the inner diameter), and the cone angle $\theta_{cone}$ of each beam 122, 124, 126 at the impingement surface 162. Here, the cone angle $\theta_{cone}$ of each beam 122, 124, 126 is the angle from the inner radius of the annulus of each beam 122, 124, 126 to the start of the respective laser beam focal lines 125A, 125B, 125C, the angle from the midpoint radius of the annulus of each beam 122, 124, 126 to the midpoint of the respective laser beam focal lines 125A, 125B, 125C, and the angle from the outer radius of the annulus of each beam 122, 124, 126 to the end of the respective laser beam focal lines 125A, 125B, 125C. Depth location refers to the first termination depth 115 and the second termination depth 117 depicted in FIG. 1B, as well as the starting point of the first laser beam focal line 125A (which may be at the impingement surface 162) and the ending point of the third laser beam focal line 125C (which may be at the second surface 164). The approximate outer diameter of each of the first, second, and third beams 122, 124, 126 at the impingement surface 162 is shown by Equations (9)-(11):

$$T_{OD}=(d_{off}+L_{top}/n)/\tan\theta_{cone1} \tag{9}$$

$$M_{OD}=(d_{off}+(L_{top}+L_{mid})/n)/\tan\theta_{cone2} \tag{10}$$

$$B_{OD}=(d_{off}+(L_{top}+L_{mid}+L_{bot})/n)/\tan\theta_{cone3} \tag{11}$$

In Equation (9), the outer diameter of the first beam 122 at the impingement surface 162 is a function of the lateral offset $T_{off}$ between the origin location 401 and the first location 402, the desired length of the first laser beam focal line 125A ($L_{top}$), the refractive index n of the transparent workpiece 160, and the cone angle $\theta_{cone1}$ of the first beam 122 at the impingement surface 162. In Equation (10), the outer diameter of the second beam 124 at the impingement surface 162 is a function of the lateral offset $T_{off}$ between the origin location 401 and the first location 402, the desired length of the first laser beam focal line 125A ($L_{top}$), the desired length of the second laser beam focal line 125B ($L_{mid}$), the refractive index n of the transparent workpiece 160, and the cone angle $\theta_{cone2}$ of the second beam 124 at the impingement surface 162. In Equation (11), the outer diameter of the third beam 126 at the impingement surface 162 is a function of the lateral offset $T_{off}$ between the origin location 401 and the first location 402, the desired length of the first laser beam focal line 125A ($L_{top}$), the desired length of the second laser beam focal line 125B ($L_{mid}$), the desired length of the third laser beam focal line 125C ($L_{bot}$), the refractive index n of the transparent workpiece 160, and the cone angle $\theta_{cone3}$ of the third beam 126 at the impingement surface 162. Because the first laser beam focal line 125A forms in the transparent workpiece 160 nearer to the impingement surface 162 than the second laser beam focal line 125B and the second laser beam focal line 125B form in the transparent workpiece nearer the third laser beam focal line 125C, the outer diameter of the third beam 126 at the impingement surface 162 ($B_{OD}$) is larger than the outer diameter of the second beam 124 at the impingement surface 162 ($M_{OD}$), which is larger than the outer diameter of the first beam 122 at the impingement surface 162 ($T_{OD}$).

Moreover, the width of the annulus of each of the first, second, and third beams 122, 124, 126 at the impingement surface 162 is shown by Equations (12)-(14):

$$T_{width}=(L_{top})/n\tan\theta_{cone1} \tag{12}$$

$$M_{width}=(L_{mid})/n\tan\theta_{cone2} \tag{13}$$

$$B_{width}=(L_{bot})/n\tan\theta_{cone3} \tag{14}$$

In Equations (12)-(14), $T_{width}$ is the width of the annulus of the first beam 122 at the impingement surface 162, $M_{width}$ is the width of the annulus of the second beam 124 at the impingement surface 162, and $B_{width}$ is the width of the annulus of the third beam 126 at the impingement surface 162. Without intending to be limited by theory, and as shown by Equations (12)-(14), in embodiments for forming a defect that is a symmetric C-chamfer shape (i.e., embodiments in which $L_{top}$, $L_{mid}$, $L_{bot}$ are equal and the magnitude of chamfer angles $\theta_{CH1}$ and $\theta_{CH3}$ are equal), the width of the annulus of the first, second, and third beams 122, 124, 126 are equal as are the cone angles of the first, second, and third beams 122, 124, 126.

Referring again to FIGS. 3A and 3B, the optical assembly 100, 100' further comprises a lens assembly 130 having a first lens 131 positioned upstream the second lens 132. The second lens 132 may focus each beam 122, 124, 126 of the laser beam combination 120 into the transparent workpiece 160, which may be positioned at an imaging plane of this second lens 132. In some embodiments, the first lens 131 and the second lens 132 each comprise plano-convex lenses, meniscus lenses, aspheres, or combinations thereof. In operation, the lens assembly 130 may control the position of the laser beam focal lines 125A, 125B, 125C along the respective beam propagation axes 121A, 121B, 121C of the beams 122, 124, 126. Moreover, each beam 122, 124, 126 may comprise an annular shape when impinging the lens 132. While the lens 132 is depicted focusing the laser beam combination 120 into laser beam focal lines 125A, 125B, 125C, other embodiments may use the phase altering optical element 140 to both phase modify and focus the laser beam combination 120, for example, without the use of the lens assembly 130.

While not intending to be limited by theory, after the laser beam combination 120 has been phase modified by the second diffractive optical element 144A or the second section 145 of the adaptive phase altering optical element 141, each laser beam focal line 125A, 125B, 125C within the transparent workpiece 160 comprises a circular or approximately circular angular spectrum. Each laser beam focal line 125A, 125B, 125C within transparent workpiece 160 has a Rayleigh range defined by a divergence factor $F_D$ greater than or equal to 10. Indeed, the embodiments described herein in which the first beam 122 and the third beam 126 impinge the impingement surface non-orthogonally, the first beam 122 and the third beam 126 are aberrated (that is, have a non-circular angular spectrum) when the beams 122, 126 are upstream the transparent workpiece 160, and upon refraction of the beams 122, 126 at the impingement surface 162 of the transparent workpiece 160, the beams 122, 126 exhibits a quasi-non-diffracting character with minimal to no aberrations within the transparent workpiece 160 (that is, the first and third laser beam focal lines 125A, 125C within transparent workpiece 160 each has a circular or approximately circular angular spectrum). Indeed, the second diffractive optical element 144A and the second section 145 of the adaptive phase altering optical element 141 are configured such that the aberration imposed on each of the first and third beams 122, 126 is the inverse of the aberration that would be imparted to a corresponding unaberrated laser beam incident to impingement surface 162 at the same angle of incidence upon refraction at impingement surface 162 into transparent workpiece 160. As a result, the aberration imposed by the second diffractive optical element 144A or the second section 145 of the adaptive phase altering optical element 141 on the first beam 122 and the third beam 126 is reversed upon refraction of the first beam 122 and the third beam 126 at the impingement surface 162 so that the first beam 122 and the third beam 126 within the transparent workpiece 160 are essentially unaberrated and the first and third laser beam focal lines 125A, 125C have essentially a circular angular spectrum. While the first beam 122 and the third beam 126 are discussed herein as impinging the transparent workpiece 160 non-orthogonally, it should be understood that embodiments are contemplated in which other beams of the laser beam combination 120 impinge the transparent workpiece non-orthogonally. Indeed, the above discussion applies to any beam of the laser beam combination 120 impinging the transparent workpiece 160 non-orthogonally.

While not intending to be limited by theory, it should be understood that Snell's law imposes some limitations on the maximum chamfer angle $\theta_{CH1}$, $\theta_{CH2}$ of the first and third laser beam focal lines 125A, 125C formed using the above described techniques (or any laser beam focal lines directed into the transparent workpiece non-orthogonally). Snell's law is mathematically defined as $$\theta_2 = \sin^{-1}\left(\frac{n_1 \sin \theta_1}{n_2}\right)$$

where $\theta_1$ is the angle of an incident light ray in a first medium (e.g., air), $\theta_2$ is the angle of the ray in a second medium (e.g., the transparent workpiece 160), $n_1$ is the index of refraction of the first medium (e.g., air, which comprises an index of refraction of about 1), and $n_2$ is the index of refraction of the second medium (e.g., the transparent workpiece 160, which may comprise about 1.45 in embodiments in which the transparent workpiece 160 comprises glass). The angles $\theta_1$ and $\theta_2$ are measured relative to the normal to the surface of incidence (e.g. impingement surface 162) of the light ray. Snell's law provides a fundamental limit on the angle of light that can be achieved within the transparent workpiece 160. This limit is the critical angle of the transparent workpiece 160. It should be understood that, for a transparent workpiece 160 comprising another material besides glass, the critical angle would vary based on the index of refraction of that particular material.

When the transparent workpiece 160 comprises glass having an index of refraction of 1.45, the critical angle is about 43.6°. The critical angle is also the internal angle a light ray would take if it contacted the glass with an almost 90° incidence. Thus, Snell's Law limits the chamfer angles $\theta_{CH1}$, $\theta_{CH2}$ of the first and third laser beam focal lines 125A, 125C. Furthermore, as the beams 122, 124, 126 each comprise a cone shape when impinging the impingement surface 162 of the transparent workpiece 160, and thus comprises a cone angle, which may be from 5° to 30°. As an example, if the first beam 122 impinges the impingement surface 162 of the transparent workpiece 160 with a cone angle of 10°, the maximum chamfer angle $\theta_{CH1}$ of the first laser beam focal line 125A inside the transparent workpiece 160 would be 33.6°, assuming light could be incident to the transparent workpiece 160 up to 90°.

While not intending to be limited by theory, some reflection of the respective beams 122, 124, 126 may occur at the impingement surface 162 of the transparent workpiece 160. For example, the reflection of a light ray impinging the impingement surface 162 at 90° relative to normal an impingement location 111A, 111B, 111C will be 100% for both S-polarization and P-polarization and the reflection of a light ray impinging the impingement surface 162 at angles less than 90° relative to normal the impingement location 111A, 111B, 111C will be less than 100% of S-polarization and P-polarization. While the respective beams 122, 124, 126 may comprise P-polarized light or S-polarized light, P-polarized light may reduce loss due to reflection. For example, at 85 degrees, the reflectance for S-polarized light is 73%, and reflectance for P-polarized light is 49%. In operation, the beam source 10, the one or more phase altering optical elements 140, or an additional optical component, such as a polarizer, may be used to S-polarize or P-polarize the respective beams 122, 124, 126. While still not intending to be limited by theory, if the magnitude of light intensity around the angular spectrum of the respective laser beam focal lines 125A, 125B, 125C within the transparent workpiece 160 is non-uniform, the respective laser beam focal lines 125A, 125B, 125C retain a circular angular spectrum and a quasi-non-diffracting character within the transparent workpiece 160. However, non-uniform magnitude of light intensity around the angular spectrum of respective laser beam focal lines 125A, 125B, 125C within the transparent workpiece 160 caused by reflection may be compensated for by launching the initial beam 12 (i.e., launching the initial beam 12 from the beam source 10) with a non-uniform intensity, where the non-uniform intensity is configured to become uniform around the angular spectrum once the light is refracted at the impingement surface 162 and enters the transparent workpiece 160. Example non-uniform intensity beams that may be used (and then converted into a quasi-non-diffracting beam with an oblong or otherwise non-uniform angular spectrum by the phase altering optical element 140) include an elliptical-Gaussian beam, a top hat beam, or another beam having an arbitrary intensity profile.

Referring now to FIGS. 9A and 9B, the relationship between chamfer angle and cone angle of the respective beams 122, 124, 126 of the laser beam combination 120 is graphically depicted. In particular, graph 20 of FIG. 9A shows the approximate magnitude of overlap between the first beam 122 and the second beam 124 as a function of cone angle $\theta_{cone}$ of the first and second beams 122, 124 (assuming they have equal cone angles $\theta_{cone}$) and the chamfer angle $\theta_{CH1}$ of the first laser beam focal line 125A in the transparent workpiece 160. The magnitude of overlap is depicted by a grayscale gradient. Region 22, which is bounded by line 21, depicts the cone angle $\theta_{cone}$ and chamfer angle $\theta_{CH1}$ combinations in which there is no overlap between the first beam 122 and the second beam 124. To minimize unwanted interference between the first beam 122 and the second beam 124, the cone angle $\theta_{cone}$ and chamfer angle $\theta_{CH1}$ may be chosen such that there is no overlap between the first beam 122 and the second beam 124. That is, the cone angle $\theta_{cone}$ and chamfer angle $\theta_{CH1}$ combination may be located in the region 22 of graph 20. Moreover, region 24, which is bounded by line 23 and includes hatch marks, represents the limits imposed by a focusing objective (e.g., the second lens 132) with a numerical aperture (NA) of 0.6. Cone angle $\theta_{cone}$ and chamfer angle $\theta_{CH1}$ combinations in region 24 are not feasible due to the NA of the second lens 132. The position of line 23 will vary depending on the numerical aperture (NA) of the focusing objective. Note that FIG. 9A assumes that the length of the first and second laser beam focal lines 125A, 125B are the same.

Graph 30 of FIG. 9B shows the approximate magnitude of overlap between the third beam 126 and the second beam 124 as a function of cone angle $\theta_{cone}$ of the second and third beams 124, 126 (assuming they have equal cone angles $\theta_{cone}$) and the chamfer angle $\theta_{CH3}$ of the third laser beam focal line 125C in the transparent workpiece 160. The magnitude of overlap is depicted by a grayscale gradient. Region 32, which is bounded by line 31 depicts the cone angle $\theta_{cone}$ and chamfer angle $\theta_{CH3}$ combinations in which there is no overlap between the third beam 126 and the second beam 124. To minimize unwanted interference between the second beam 124 and the third beam 126, the cone angle $\theta_{cone}$ and chamfer angle $\theta_{CH3}$ may be chosen such that there is no overlap between the second beam 124 and the third beam 126. That is, the cone angle $\theta_{cone}$ and chamfer angle $\theta_{CH3}$ combination may be located in the region 32 of graph 30. Moreover, region 34, which is bounded by line 33 and includes hatch marks, represents the limits imposed by a focusing objective (e.g., the second lens 132) with a numerical aperture (NA) of 0.6. Cone angle $\theta_{cone}$ and chamfer angle $\theta_{CH3}$ combinations in region 34 are not feasible due to the NA of the second lens 132. The position of line 33 will vary depending on the numerical aperture (NA) of the focusing objective. Note that FIG. 9B assumes that the length of the second and third laser beam focal lines 125B, 125C are the same. Indeed, FIGS. 9A and 9B assume that the length of the first, second and third laser beam focal lines 125A, 125B, 125C are the same. As shown in FIGS. 9A and 9B, the region 22 of FIG. 9A is smaller than the region 32 of FIG. 9B. Reducing the length of the second laser beam focal line 125B relative to the first and third laser beam focal lines mitigates this overlap difference and reduces the difference between the region 22 for FIG. 9A and the region 32 of FIG. 9B.

Referring again to FIGS. 1A-3B, in operation, the laser beam combination 120 may be translated relative to the transparent workpiece 160 (e.g., in the translation direction 101) along the contour line 165 to form the plurality of defects 172 of the contour 170. Directing or localizing the laser beam combination 120 into the transparent workpiece 160 generates an induced absorption (e.g. nonlinear absorption, multiphoton absorption) within the transparent workpiece 160 and deposits enough energy to break chemical bonds in the transparent workpiece 160 at spaced locations along the contour line 165 to form the defects 172. According to one or more embodiments, the laser beam combination 120 may be translated across the transparent workpiece 160 by motion of the transparent workpiece 160 (e.g., motion of a translation stage 109 coupled to the transparent workpiece 160, as shown in FIGS. 3A and 3B), motion of the laser beam combination 120 (e.g., motion of the respective laser beam focal lines 125A, 125B, 125C), or motion of both the transparent workpiece 160 and the respective laser beam focal lines 125A, 125B, 125C.

Referring again to FIGS. 1A-9B, the defects 172 may generally be spaced apart from one another by a distance along the contour 170 of from about 0.1 μm to about 500 μm, for example, about 1 μm to about 200 μm, about 2 μm to about 100 μm, about 5 μm to about 20 μm, or the like. For example, suitable spacing between the defects 172 may be from about 0.1 μm to about 50 μm, such as from about 5 μm to about 15 μm, from about 5 μm to about 12 μm, from about 7 μm to about 15 μm, or from about 7 μm to about 12 μm. In some embodiments, a spacing between adjacent defects 172 may be about 50 μm or less, 45 μm or less, 40 μm or less, 35 μm or less, 30 μm or less, 25 μm or less, 20 μm or less, 15 μm or less, 10 μm or less, or the like.

As illustrated in FIGS. 1A and 1B, the plurality of defects 172 of the contour 170 extend into the transparent workpiece 160 and establish a path for crack propagation for separation of the transparent workpiece 160 into separate portions along the contour 170. Forming the contour 170 comprises translating at least one of the laser beam combination 120 and the transparent workpiece 160 relative to one another (e.g., in the translation direction 101) along the contour line 165 to form the plurality of defects 172 of the contour 170. According to one or more embodiments, the laser beam combination 120 may be translated across the transparent workpiece 160 by motion of the transparent workpiece 160, motion of the laser beam combination 120 (e.g., motion of the laser beam focal lines 125A, 125B, 125C), or motion of both the transparent workpiece 160 and the laser beam combination 120, for example, using one or more translation stages 109 (FIGS. 2A and 2B). By translating the laser beam focal lines 125A, 125B, 125C relative to the transparent workpiece 160, the plurality of defects 172 may be formed in the transparent workpiece 160, wherein each of the plurality of defects 172 comprising defect segments 172 having a variety of defect angles.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam combination 120 (e.g., the Z direction). Representative wavelengths for many glass workpieces include fundamental and harmonic wavelengths of $Nd^{3+}$ (e.g. $Nd^{3+}$:YAG or $Nd^{3+}$:$YVO_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam combination 120 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 10 (e.g., a pulsed beam source such as an ultra-short pulse laser) in combination with the one or more phase altering optical elements 140, the first lens 131, and the second lens 132, to irradiate the transparent workpiece 160 and generate the laser beam focal lines 125A, 125B, 125C. The laser beam focal lines 125A, 125B, 125C comprise quasi-non-diffracting beams, such as a Gauss-Bessel beam or Bessel beam, as defined above, and may fully or partially perforate the transparent workpiece 160 to form defects 172, with defect segments comprising a variety of defect angles in the transparent workpiece 160, which may form the contour 170. In embodiments in which the laser beam combination 120 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring now to FIGS. 10A and 10B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 µJ/burst and 2 sub-pulses, the 100 µJ/burst energy is split between the 2 pulses for an average energy of 50 µJ per sub-pulse and for a pulse burst having an energy of 100 µJ/burst and 10 sub-pulses, the 100 µJ/burst is split amongst the 10 sub-pulses for an average energy of 10 µJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 10A and 10B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 11B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by about 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 10 described herein, the time separation $T_b$ (FIG. 11B) is about 5 microseconds for the beam source 10 outputting an initial beam 12 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 μJ per mm of thickness of material. For example, in embodiments, the average laser power per burst may be from about 40 μJ/mm to about 2500 μJ/mm, or from about 500 μJ/mm to about 2250 μJ/mm. In a specific example, for 0.5 mm to 0.7 mm thick Corning EAGLE XG® transparent workpiece, pulse bursts of from about 300 μJ to about 600 μJ may cut and/or separate the workpiece, which corresponds to an exemplary range of about 428 μJ/mm to about 1200 μJ/mm (e.g., 300 μJ/0.7 mm for 0.7 mm EAGLE XG® glass and 600 μJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 μJ to about 750 μJ, e.g., from about 50 μJ to about 500 μJ, or from about 50 μJ to about 250 μJ. For some glass compositions, the pulse energy (e.g., pulse burst energy) may be from about 100 μJ to about 250 μJ. However, for some glass compositions, the pulse energy (e.g., pulse burst energy) may be higher (e.g., from about 300 μJ to about 500 μJ, or from about 400 μJ to about 600 μJ, depending on the specific glass composition of the transparent workpiece 160).

The portion of the first, second, and third beams 122, 124, 126 directed into the transparent workpiece 160 may comprise a persistent intensity homogeneity. As used herein, the term "persistent intensity homogeneity" means that an intensity of the laser beam at any point within any of the laser beam focal lines 125A, 125B, and 125C does not vary by more than 50% from the average intensity assessed collectively over the laser beam focal lines 125A, 125B, and 125C. In the embodiments described in this disclosure, the persistent intensity homogeneity of the laser beam throughout the portion of the laser beam focal region within the transparent workpiece is such that the intensity for any point within any of the focal lines present in the transparent workpiece, the extrema (i.e., the minimum or maximum) of the intensity of the laser beam is greater than or equal to about is between 50% and 150% of the average intensity assessed collectively over all of the focal lines in the transparent workpiece.

While not intending to be limited by theory, the use of a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

An example intensity distribution of a laser beam focal line over distance is shown in FIG. 10C. FIG. 10C demonstrates generation of a Bessel beam using a Gaussian laser input. When a Gaussian input beam is passed through a phase altering optical element, the characteristic maximum intensity distribution of the Bessel beam with respect to Z initially rises due to an increase in Gaussian beam radius and then gradually falls off due to reduced intensity of the Gaussian input at larger radii. One way to counteract this asymmetry is to place the impingement surface 162 of the transparent workpiece 160 greater than or equal to 0.05 mm, greater than or equal to 0.08 mm, greater than or equal to 0.10 mm, greater than or equal to 0.12 mm, greater than or equal to 0.15 mm, greater than or equal to 0.18 mm, or greater than or equal to 0.20 mm downstream from the formation of the first laser beam focal line 125A, such that the first laser beam focal line 125A comprises a portion external the transparent workpiece 160. Placing the impingement surface 162 of the transparent workpiece 160 downstream from the formation of the first laser beam focal line 125A may result in a greater beam intensity at the impingement surface 162, ensuring that the internal defect plane of the first defect segment 172A connects with the impingement surface 162.

Referring now to FIG. 11A, another way to counteract the asymmetry shown in FIG. 10C is to modify the initial beam 12 from the standard Gaussian shape. Graph 40 of FIG. 11A shows the maximum beam intensity as a function of distance in the beam propagation direction for laser beam focal lines formed using a variety of initial beams. Graph 40 shows the maximum beam intensity as a function of propagation distance for laser beam focal lines formed using a Gaussian initial beam in line 42, an annular section of a Gaussian initial beam in line 44 (referred to as an annular Gaussian input beam), an annular section of a Gaussian input beam with a super-Gaussian roll-off near its edges in line 46 (referred to as an annular super-Gaussian input beam), an annular section of a Gaussian input beam with a super-Gaussian roll-off near its edges and a 1/R intensity profile (referred to as an annular super-Gaussian input beam with a 1/R intensity profile) in line 48.

Referring also FIGS. 11B-11E, input beam intensity profiles are shown in XY cross-section for laser beam focal lines formed using the initial beams graphically depicted in FIG. 11A. FIG. 11B shows an input beam intensity profile for a Gaussian input beam (e.g., the Gaussian input beam of line 42). FIG. 11C shows an input beam intensity profile for an annular section of a Gaussian input beam (e.g., the annular Gaussian input beam of line 44). FIG. 11D shows an input beam intensity profile for laser beam focal lines generated using an annular section of a Gaussian input beam with a super-Gaussian roll-off near its edges (e.g., the annular super-Gaussian input beam of line 46). FIG. 11E shows an input beam intensity profile for laser beam focal lines generated an annular section of a Gaussian input beam with a super-Gaussian roll-off near its edges and a 1/R intensity profile (e.g., the annular super-Gaussian input beam with a 1/R intensity profile of line 48).

In comparison to the Gaussian-generated laser beam focal lines, the addition of the annulus shape of line 44 reduces the length of the laser beam focal lines but causes intensity fluctuations due to hard edges on the annuli that can cause diffractive effects. This can be solved by rounding or "softening" the edges of the annulus e.g., by using a super-Gaussian initial beam together with an annular shape. Without intending to be limited by theory, a super-Gaussian beam is a Gaussian beam having an intensity beam profile with a flattened top and an accelerated but smooth intensity rolloff near its edge. A super-Gaussian beam is approximated by the intensity profile of Equation (21):

$$I(r)=I_0 e^{-2(T/w_0)^n}, \text{ where } n>2 \qquad (21)$$

In Equation (21), $I(r)$ is the intensity of the beam at a radius $r$, $I_0$ is the peak intensity of the beam, and $w_0$ is the beam waist and $n$ is the order of the super-Gaussian. Increasing the order $n$ the super-Gaussian increases the steepness of the edges of the intensity profile. Moreover, as shown by line 48, adding a 1/R intensity profile to the initial beam creates a flat-top intensity distribution in the generated laser beam focal line. Similarly, the amplitudes of the annular beam intensities can be controlled to flatten the focal intensity distribution of the resulting laser beam focal lines.

Referring again to FIGS. 3A and 3B, the optical assembly 100, 100' may be configured to further alter the laser beam combination 120 such that a cross-section of each beam 122, 124, 126 at the impingement surface 162 of the transparent workpiece 160 is non-axisymmetric and thus a cross-section of each laser beam focal line 125A, 125B, 125C is non-axisymmetric, for example, using the methods and systems described in U.S. Pat. No. 10,730,783, hereby incorporated by reference in its entirety. For example, the beam spots 112A, 112B, 112C formed by the beams 122, 124, 126 at the impingement surface 162 the transparent workpiece 160 may comprise a non-axisymmetric beam spot having a long axis and a short axis such that the defect segments 172A, 172B, 172C formed using laser beam focal lines 125A, 125B, 125C comprise a central defect region formed at the intersection of the long axis and the short axis and one or more radial arms formed in the direction of the long axis Defect segments 172A, 172B, 172C formed using laser beam focal lines 125A, 125B, 125C having a non-axisymmetric beam spot oriented such that the long axis of each beam spot 112A, 112B, 112C extends along the contour line 165 thereby forming defects 172 with radial arms that extend along the contour line 165. By controlling the laser beam focal lines 125A, 125B, 125C such that the direction of the radial arms of each defect 172 extends along the contour line 165, crack propagation may be better controlled.

In embodiments in which the phase altering optical element 140 comprises the adaptive phase altering optical element 141, laser beam focal lines 125A, 125B, 125C with cross-sections that are non-axisymmetric may be formed by altering the phase modulation applied by the adaptive phase altering optical element 141. Further, as described in described in U.S. Pat. No. 10,730,783, in embodiments in which the phase altering optical element 140 comprises a static phase altering optical element 142 (e.g., the diffractive optical elements 144A, 144B), the laser beam focal lines 125A, 125B, 125C with cross-sections that are non-axisymmetric may be formed by altering the diffraction regions 148A, 148B, 148C of the second diffractive optical element 144B, blocking a portion of each beam 122, 124, 126 of the laser beam combination 120.

Referring again to FIGS. 1A-11E, in some embodiments, the transparent workpiece 160 may be further acted upon in a subsequent separating step to induce separation of the transparent workpiece 160 along the contour 170 to form a separated transparent article comprising an angled edge (FIGS. 12A-12B). The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 μm to 13 μm, for example, a range of 4 μm to 12 μm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

Referring now to FIGS. 12A and 12B an example transparent workpiece 260 and a resultant separated article 260' formed from the transparent workpiece 260 using the methods and systems described herein are schematically depicted. As one example, FIG. 12A depicts a schematic side view of a transparent workpiece 260 comprising a plurality of defects 272, including a first defect 272a, a second defect 272b, and a third defect 272c. The first defect 272a extends from an impingement surface 262 to a first end of the second defect 272b, the second defect 272b extends from an end of the first defect 272a to an end of the third defect 272c, and the third defect 272c extends from a second end of the second defect 272b to the second surface 264. In operation, the transparent workpiece 260 may be separated along the plurality of defects 272 using the embodiments described herein to form a separated article 260' having a C-chamfered edge 268, as depicted in FIG. 12B.

EXAMPLES

FIG. 13 depicts a simulation of a laser beam combination 120 focused into first, second, and third laser beam focal lines 125A, 125B, 125C within a 700 μm thick glass substrate. The first laser beam focal line 125A comprises a chamfer angle $\theta_{chamf}$=23° and a cone angle $\theta_{cone}$=9°, the second laser beam focal line 125B comprises a length $L_{mid}$=233 μm, and the third laser beam focal line 125C comprises a chamfer angle $\theta_{chamf}$=23° and a cone angle $\theta_{cone}$=9°. The combination of laser beam focal lines simulated in FIG. 13 forms a C-chamfered shape that may be used to form C-chamfered defects and thereafter a separated article having a C-chamfered edge.

FIG. 14 depicts a surface profile of a C-chamfered edge on a separated article formed using the optical assembly 100 of FIG. 3A in which the adaptive phase altering optical element 141 comprises a spatial light modulator to form the laser beam combination, which is telescoped by lens assembly at a demagnification ratio of 33:1. The beam source used in this example is a PHAROS® femtosecond laser made by Light-Conversion of Vilnius, Lithuania. The initial beam that is transformed into the laser beam combination was emitted by the beam source in 1 mJ pulse-bursts of 5 sub-pulses per pulse burst, each sub-pulse temporally separated by 15 ns. The pulse bursts were emitted at a 10 kHz repetition rate with a pulse width of 10 ps and a wavelength of 1030 nm. To form the separated article of FIG. 14, C-chamfered defects were formed in a transparent workpiece with a spacing between adjacent defects of 10 μm pitch. In addition, a 30° wedge of each beam of the laser beam combination was blocked to form non-axisymmetric defects shaped to facilitate crack formation in the cutting direction.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:

directing a laser beam combination comprising a first beam and a second beam into the transparent workpiece simultaneously, the first beam passing through an impingement surface of the transparent workpiece at a first impingement location and the second beam passing through the impingement surface of the transparent workpiece at a second impingement location, wherein:

the first beam of the laser beam combination forms a first laser beam focal line in the transparent workpiece and generates a first induced absorption to produce a first defect segment within the transparent workpiece, the first defect segment having a first chamfer angle;

the second beam of the laser beam combination forms a second laser beam focal line in the transparent workpiece and generates a second induced absorption to produce a second defect segment within the transparent workpiece, the second defect segment having a second chamfer angle, the second chamfer angle differing from the first chamfer angle; and the second laser beam focal line extends from a first termination location positioned at a first termination depth within the transparent workpiece to a second termination location positioned at a second termination depth within the transparent workpiece.

2. The method of claim 1, wherein the first impingement location and the second impingement location are laterally offset along the impingement surface.

3. The method of claim 1, wherein the second chamfer angle is greater than 5° relative to a plane orthogonal to the impingement surface at the second impingement location.

4. The method of claim 1, wherein the second chamfer angle is less than 1° relative to a plane orthogonal to the impingement surface at the second impingement location.

5. The method of claim 1, wherein the first laser beam focal line extends between the impingement surface and the first termination depth within the transparent workpiece and terminates at the first termination location.

6. The method of claim 1, wherein the laser beam combination further comprises a third beam directed into the transparent workpiece at a third impingement location, wherein the third beam forms a third laser beam focal line in the transparent workpiece and generates a third induced absorption to produce a third defect segment within the transparent workpiece, the third defect segment having a third chamfer angle, the third chamfer angle differing from the second chamfer angle.

7. The method of claim 6, wherein:

the first laser beam focal line extends between the impingement surface and a first termination depth within the transparent workpiece and terminates at a first termination location positioned at the first termination depth;

the second laser beam focal line extends from the first termination location at the first termination depth to a second termination location positioned at a second termination depth within the transparent workpiece, where the first termination depth is closer to the impingement surface of the transparent workpiece than the second termination depth; and the third laser beam focal line extends from the second termination location toward a second surface of the transparent workpiece.

8. The method of claim 1, further comprising impinging the laser beam combination onto a phase altering optical element to apply a phase alteration to the first beam and the second beam.

9. The method of claim 8, wherein the first beam comprises an oblong angular spectrum when produced in free space downstream from the phase altering optical element, the oblong angular spectrum comprising an axis of symmetry extending from a first axis end having a first radius of curvature to a second axis end having a second radius of curvature, where the first radius of curvature and the second radius of curvature are different.

10. The method of claim 9, wherein the second beam incident to the impingement surface comprises a circular angular spectrum.

11. The method of claim 8, wherein:

the phase altering optical element comprises a diffractive optical element comprising a first diffraction region that is laterally offset from a second diffraction region along a surface of the diffractive optical element;

the first diffraction region is configured to apply an aberration corrected quasi-non-diffracting phase and a prism phase to the first beam of the laser beam combination; and the second diffraction region is configured to apply a quasi-non-diffracting phase to the second beam of the laser beam combination.

12. The method of claim 11, wherein the diffractive optical element is a second diffractive optical element and the method further comprises directing an initial beam output by a beam source onto a first diffractive optical element comprising a diffractive beam splitter, the diffractive beam splitter forming the laser beam combination from the initial beam and directing the laser beam combination to the second diffractive optical element.

13. The method of claim 8, wherein the phase altering optical element comprises an adaptive phase altering optical element.

14. The method of claim 13, wherein the applying the phase alteration to the first beam and the second beam comprises:

directing an initial beam from a beam source onto a first section of the adaptive phase altering optical element, the first section forming the laser beam combination from the initial beam; and directing the laser beam combination from the first section toward a second section of the adaptive phase altering optical element, the second section phase altering the first beam and the second beam of the laser beam combination.

15. The method of claim 14, wherein:

the first section of the adaptive phase altering optical element comprises a beam splitting phase mask configured to split the initial beam into the laser beam combination; and the second section of the adaptive phase altering optical element comprises a first quasi-non-diffracting phase mask configured to apply an aberration corrected quasi-non-diffracting phase and a prism phase to the first beam of the laser beam combination and a second quasi-non-diffracting phase mask configured to apply a quasi-non-diffracting phase to the second beam of the laser beam combination.

16. The method of claim 15, wherein:

the first section and the second section of the adaptive phase altering optical element are laterally offset along a surface of the adaptive phase altering optical element; and the first quasi-non-diffracting phase mask and the second quasi-non-diffracting phase mask of the second section are laterally offset along the surface of the adaptive phase altering optical element.

17. The method of claim 1, further comprising translating at least one of the transparent workpiece and the laser beam combination relative to each other along a contour line to form a contour comprising a plurality of defects in the transparent workpiece.

18. The method of claim 1, wherein the first beam of the laser beam combination is output by a first beam source and the second beam of the laser beam combination is output by a second beam source.

19. The method of claim 1, wherein the first laser beam focal line and the second laser beam focal line each comprise a circular angular spectrum.

20. The method of claim 1, wherein the first chamfer angle is greater than 10° relative to a plane orthogonal to the impingement surface at the first impingement location.

21. A method for processing a transparent workpiece, the method comprising:

directing a laser beam combination comprising a first beam and a second beam into the transparent workpiece simultaneously, the first beam passing through an impingement surface of the transparent workpiece at a first impingement location and the second beam passing through the impingement surface of the transparent workpiece at a second impingement location;

wherein the first beam of the laser beam combination forms a first laser beam focal line in the transparent workpiece and generates a first induced absorption to produce a first defect segment within the transparent workpiece, the first defect segment having a first chamfer angle;

wherein the second beam of the laser beam combination forms a second laser beam focal line in the transparent workpiece and generates a second induced absorption to produce a second defect segment within the transparent workpiece, the second defect segment having a second chamfer angle, the second chamfer angle differing from the first chamfer angle; and wherein the first laser beam focal line and the second laser beam focal line each comprise:

a wavelength $\lambda$;

a spot size $w_o$; and a Rayleigh range $Z_R$ that is greater than $$F_D \frac{\pi w_o^2}{\lambda},$$

where $F_D$ is a dimensionless divergence factor comprising a value of 10 or greater.

22. A phase altering optical element comprising:

a diffractive optical element comprising a first diffraction region that is laterally offset from a second diffraction region along a surface of the diffractive optical element;

the first diffraction region is configured to apply an aberration corrected quasi-non-diffracting phase and a prism phase to a first beam of a laser beam combination; and the second diffraction region is configured to apply a quasi-non-diffracting phase to a second beam of the laser beam combination, wherein the phase altering optical element comprises an adaptive phase altering optical element.

* * * * *